US008707648B2

(12) United States Patent
Timko et al.

(10) Patent No.: US 8,707,648 B2
(45) Date of Patent: *Apr. 29, 2014

(54) RETAINER AND PANEL WITH INSERT FOR INSTALLING WALL COVERING PANELS

(75) Inventors: William J. Timko, Suwanee, GA (US); Mark Brinkman, Gainesville, GA (US)

(73) Assignee: Fry Reglet Corporation, Alhambra, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 12/959,626

(22) Filed: Dec. 3, 2010

(65) Prior Publication Data

US 2011/0083392 A1  Apr. 14, 2011

Related U.S. Application Data

(63) Continuation-in-part of application No. 11/392,044, filed on Mar. 29, 2006, now Pat. No. 7,971,404.

(60) Provisional application No. 60/669,757, filed on Apr. 8, 2005.

(51) Int. Cl.
*E04F 13/09* (2006.01)
*E04F 13/08* (2006.01)

(52) U.S. Cl.
CPC .................................. *E04F 13/0862* (2013.01)
USPC .................... 52/511; 52/476; 52/775; 52/780

(58) Field of Classification Search
USPC ................... 52/202, 506.03, 507, 511; 49/57
See application file for complete search history.

(56) References Cited

U.S. PATENT DOCUMENTS

| | | | |
|---|---|---|---|
| 1,760,265 A | 5/1930 | Carr | |
| 1,805,334 A | 5/1931 | Kelly | |
| 1,896,875 A | 2/1933 | Walters | |
| 2,059,483 A | 11/1936 | Parsons | |
| 2,337,239 A | 12/1943 | Hall | |
| 2,379,595 A * | 7/1945 | Roe | 52/384 |
| 2,403,881 A | 7/1946 | Tarbox | |
| 3,491,486 A | 1/1970 | Caruth | |
| 3,832,820 A * | 9/1974 | Eggert | 52/506.08 |
| 3,969,865 A | 7/1976 | Andersen | |
| 4,452,020 A * | 6/1984 | Werner | 52/202 |
| 5,056,287 A | 10/1991 | Weber | |
| 5,058,356 A * | 10/1991 | Yamamoto et al. | 52/511 |
| 5,123,225 A | 6/1992 | Goodworth | |
| 5,653,076 A * | 8/1997 | Habraken et al. | 52/481.2 |
| 5,692,345 A | 12/1997 | Mogaki et al. | |
| 5,716,161 A | 2/1998 | Moore et al. | |

(Continued)

OTHER PUBLICATIONS

Non-Final Office Action for U.S. Appl. No. 11/392,044, mailed Apr. 29, 2008 (18 pages).

(Continued)

*Primary Examiner* — Michael Safavi
(74) *Attorney, Agent, or Firm* — Kilpatrick Townsend & Stockton LLP

(57) ABSTRACT

Systems and methods for installing one or more modular panels onto a wall or other surface. Such systems may include at least one panel retainer mounted to a substrate and at least one panel connected to the panel retainer in a removable fashion. In these systems, the interaction of at least one panel insert and at least one attachment structure facilitates connecting the panel to the panel retainer in a removable fashion.

17 Claims, 38 Drawing Sheets

(56) References Cited

U.S. PATENT DOCUMENTS

| | | | |
|---|---|---|---|
| 5,845,447 | A | 12/1998 | Bodine et al. |
| 6,170,214 | B1 | 1/2001 | Treister et al. |
| 6,364,404 | B1 | 4/2002 | De Paoli |
| 6,510,635 | B1 | 1/2003 | Rudolph et al. |
| 6,588,165 | B1 | 7/2003 | Wright |
| 6,968,661 | B2 * | 11/2005 | Kopish et al. ............... 52/489.1 |
| 7,107,732 | B2 | 9/2006 | Kinzler |
| 7,210,273 | B2 | 5/2007 | Zahner, III |
| 7,217,059 | B1 * | 5/2007 | Rudduck ....................... 403/324 |
| 7,524,129 | B2 * | 4/2009 | Selle ............................. 403/13 |
| 8,096,089 | B2 * | 1/2012 | Platt ............................... 52/316 |
| 2006/0000177 | A1 | 1/2006 | Salzano et al. |
| 2006/0179762 | A1 | 8/2006 | Thome et al. |
| 2006/0272277 | A1 | 12/2006 | Timko et al. |

OTHER PUBLICATIONS

Amendment and Response for U.S. Appl. No. 11/392,044, filed Sep. 23, 2008 (10 pages).
Final Office Action for U.S. Appl. No. 11/392,044, mailed Apr. 29, 2009 (16 Pages).
Amendment and Response for U.S. Appl. No. 11/392,044, filed Jun. 29, 2009 (13 pages).
Non-Final Office Action for U.S. Appl. No. 11/392,044, mailed Oct. 5, 2009 (13 pages).
Notice of Allowance for U.S. Appl. No. 11/392,044, mailed Mar. 18, 2011 (5 Pages).
Advisory Action for U.S. Appl. No. 11/392,044, mailed Jul. 20, 2009 (16 Pages).
Amendment and Response for U.S. Appl. No. 11/392,044, filed Mar. 4, 2010 (18 pages).

* cited by examiner

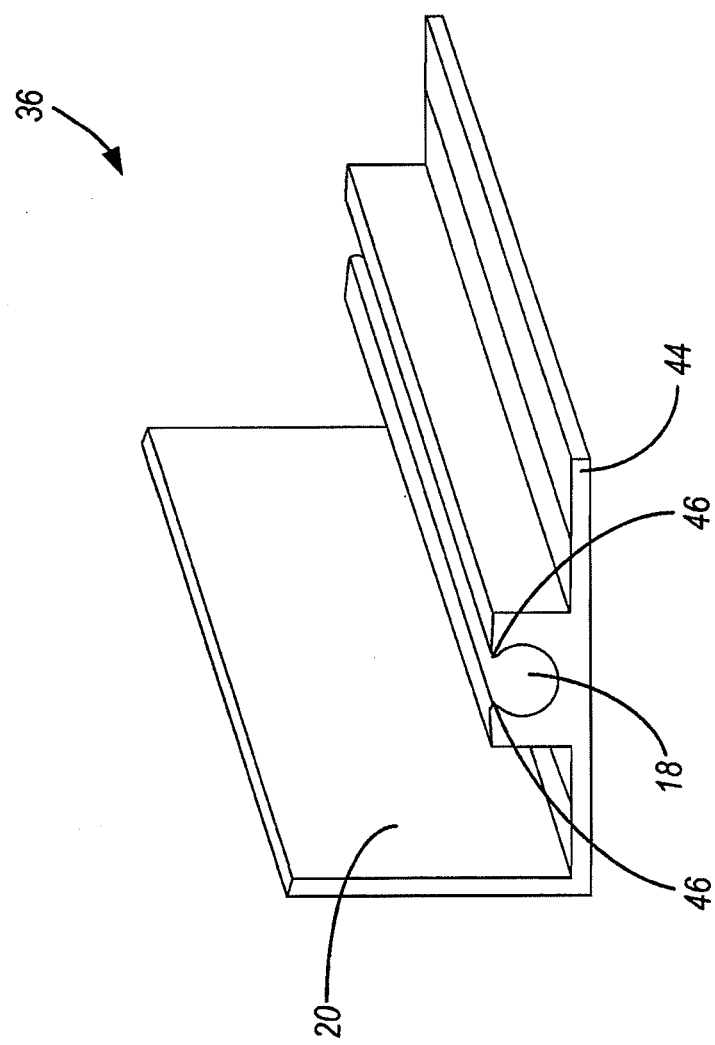

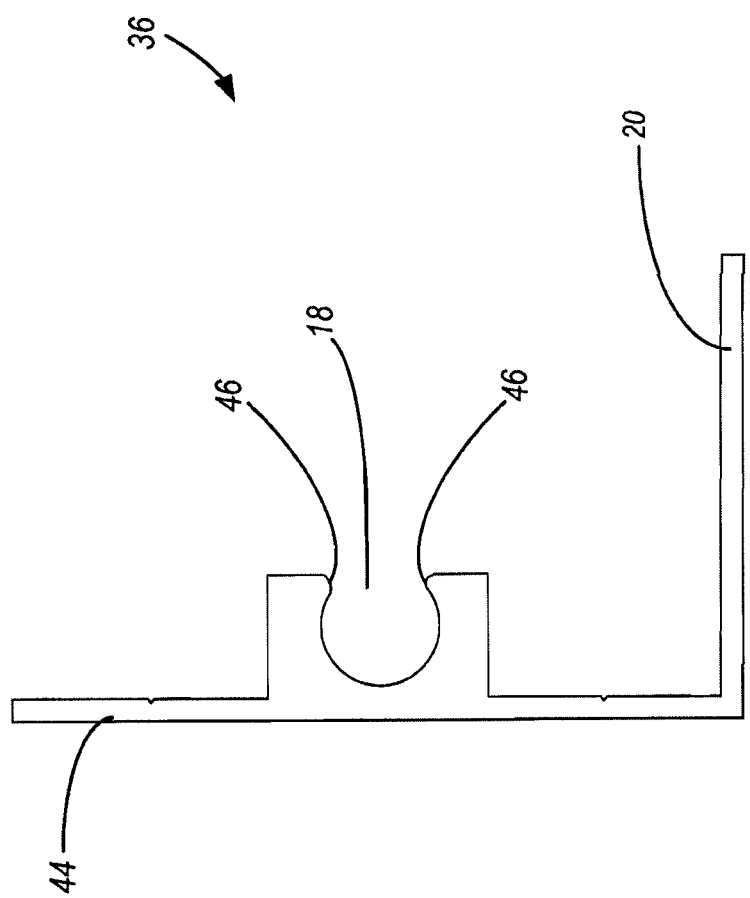

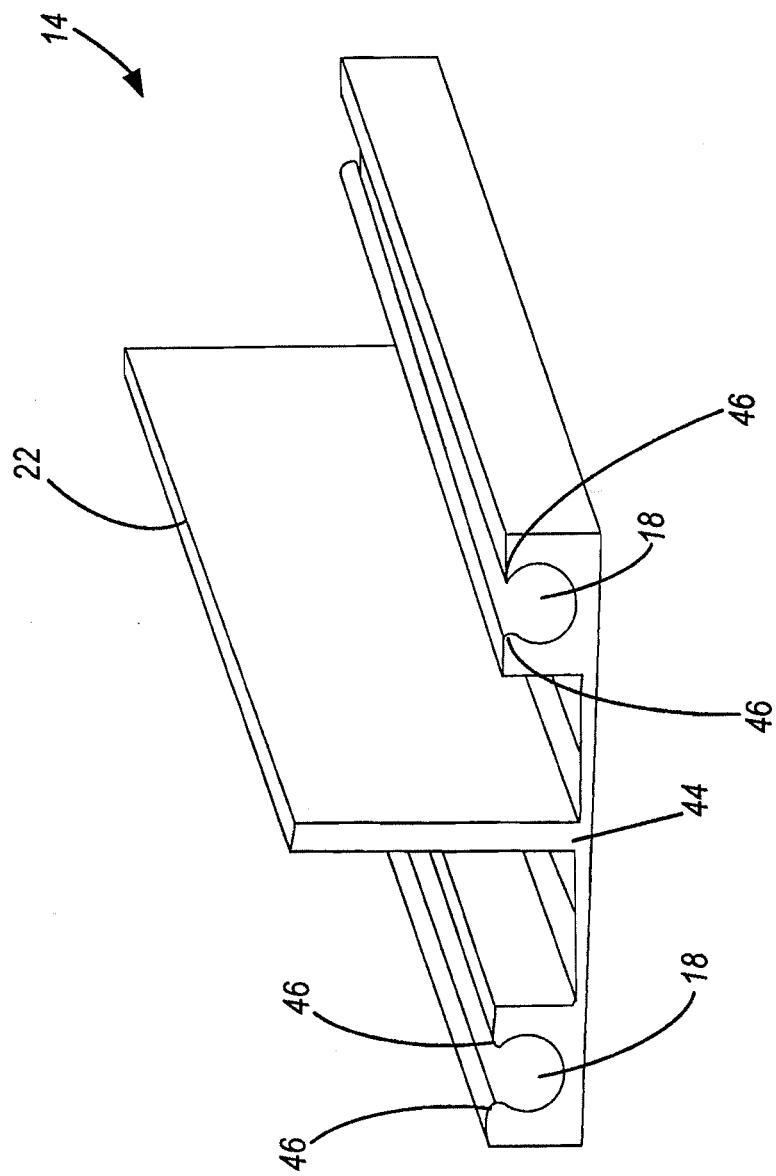

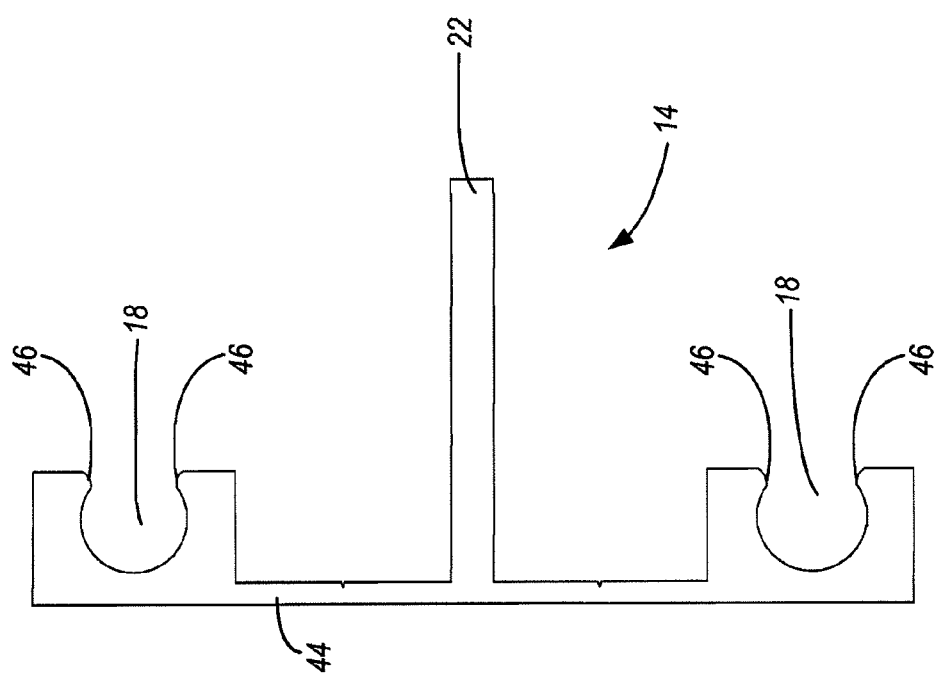

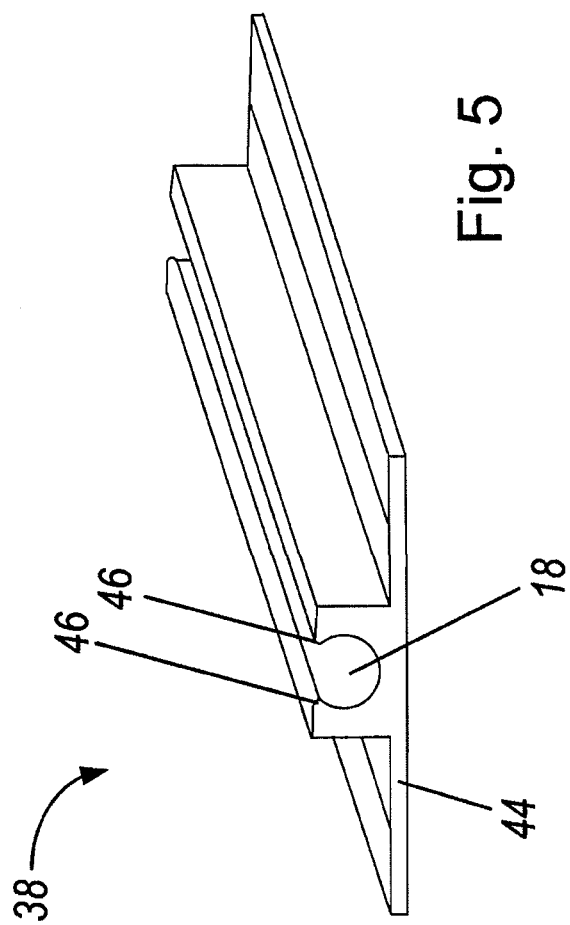

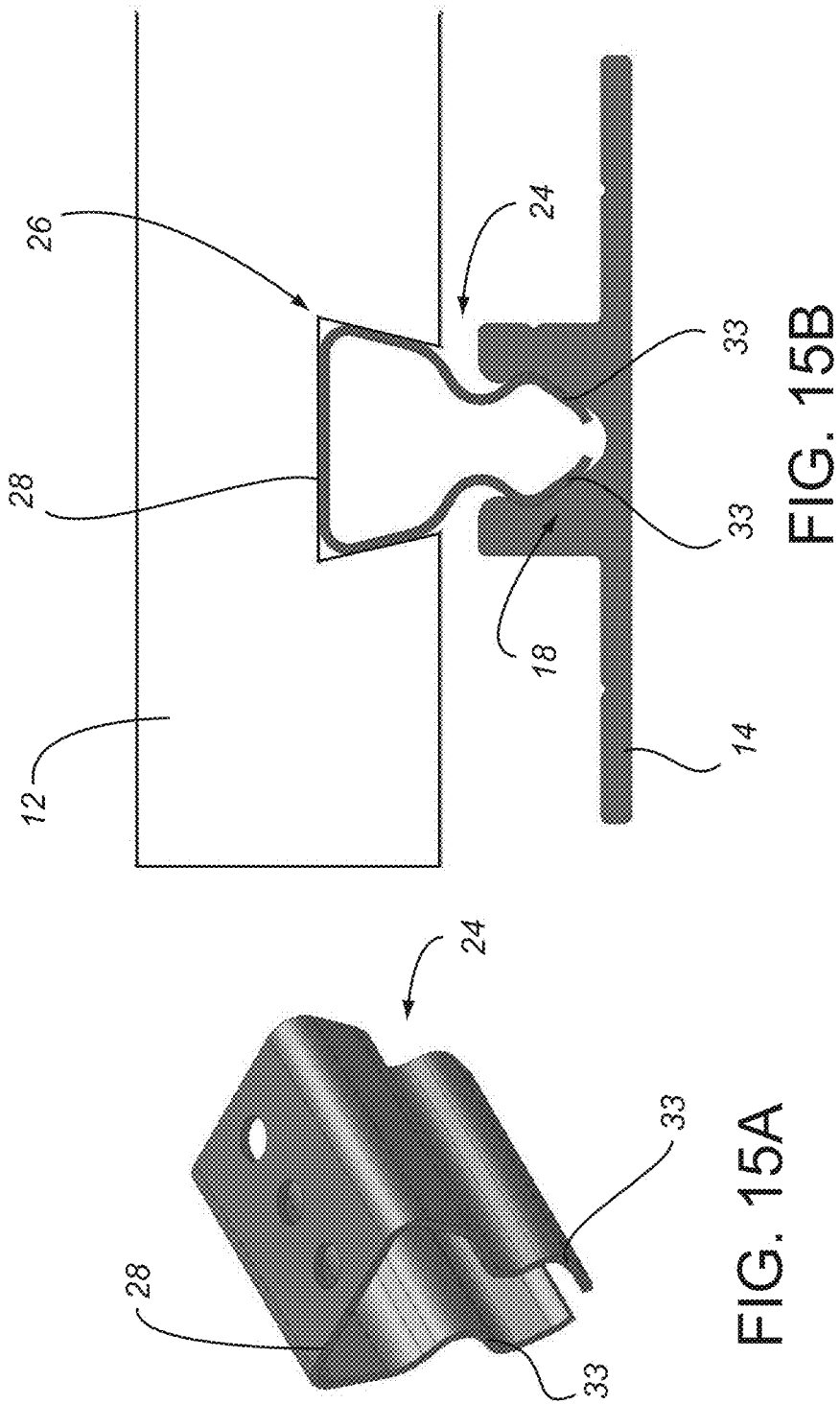

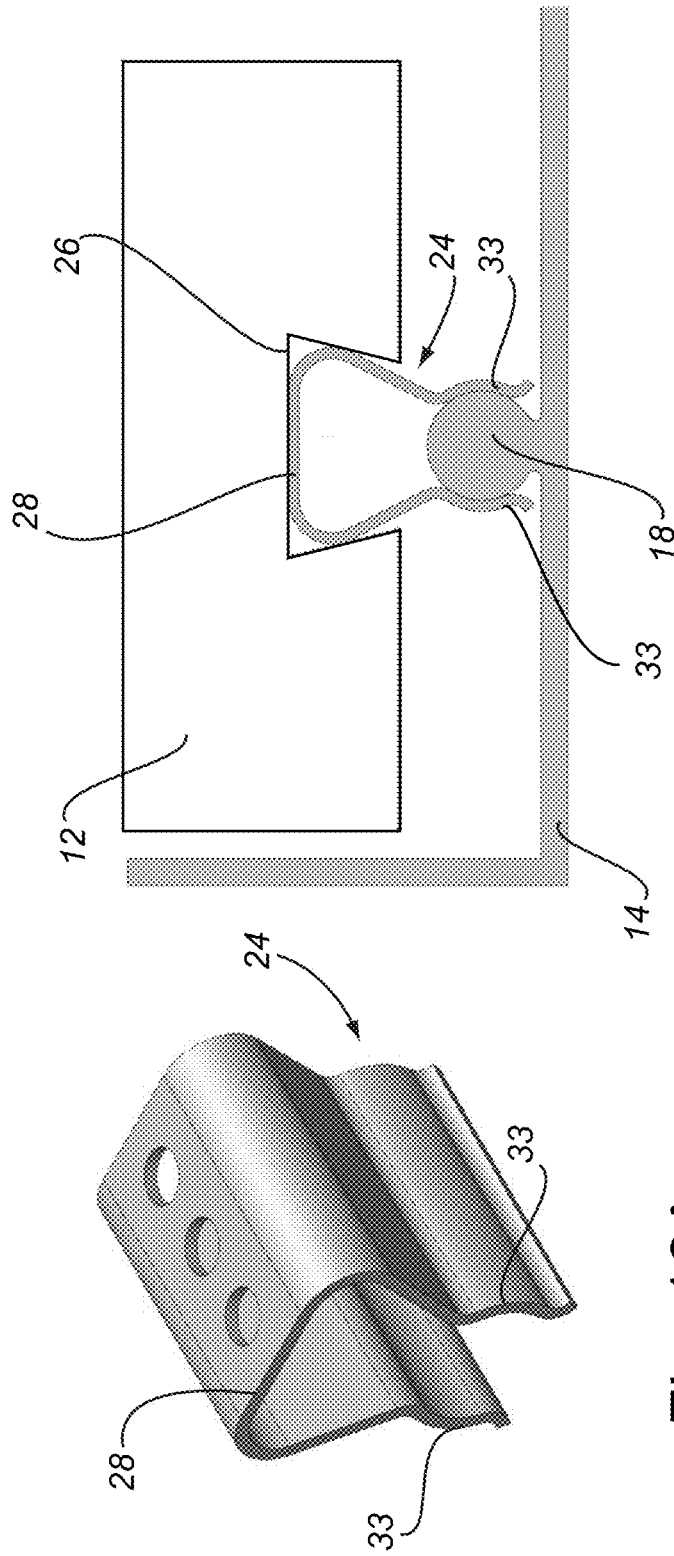

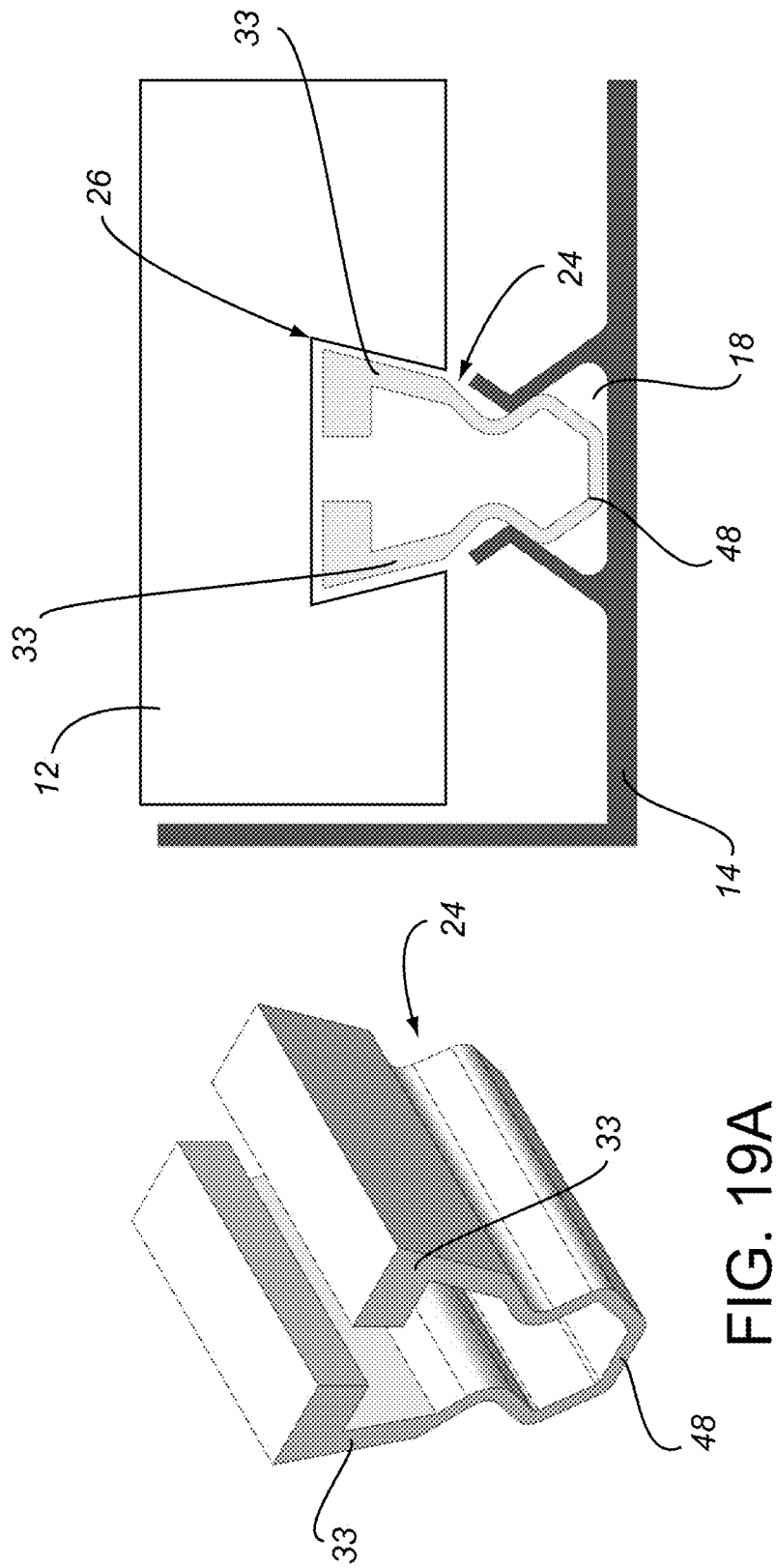

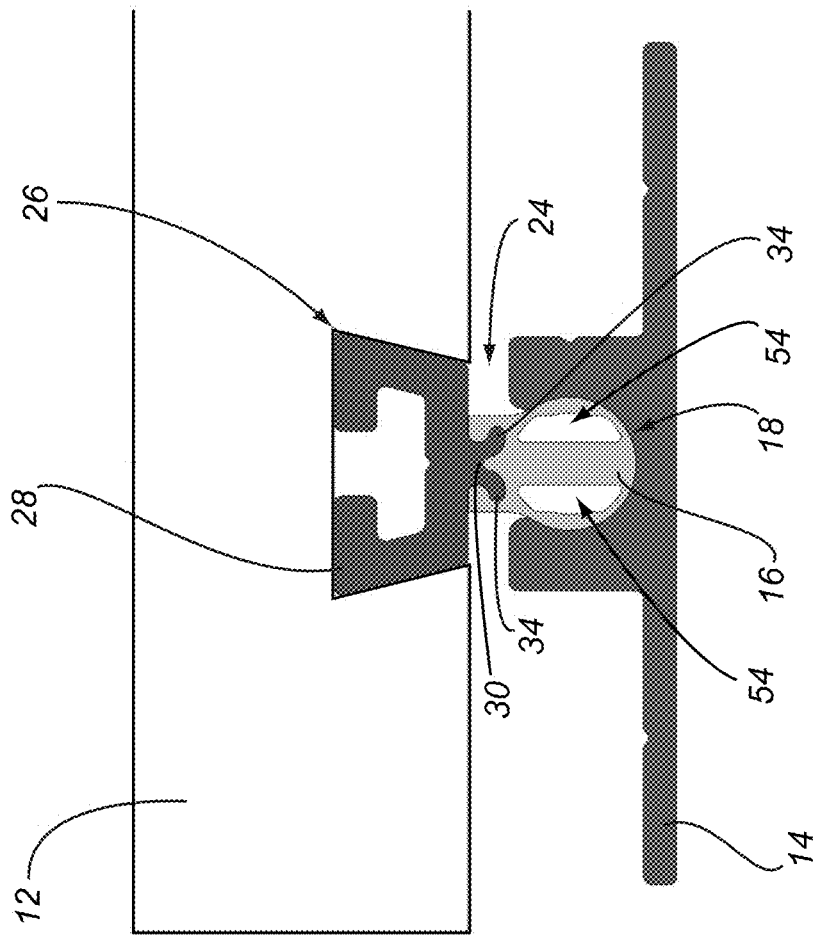
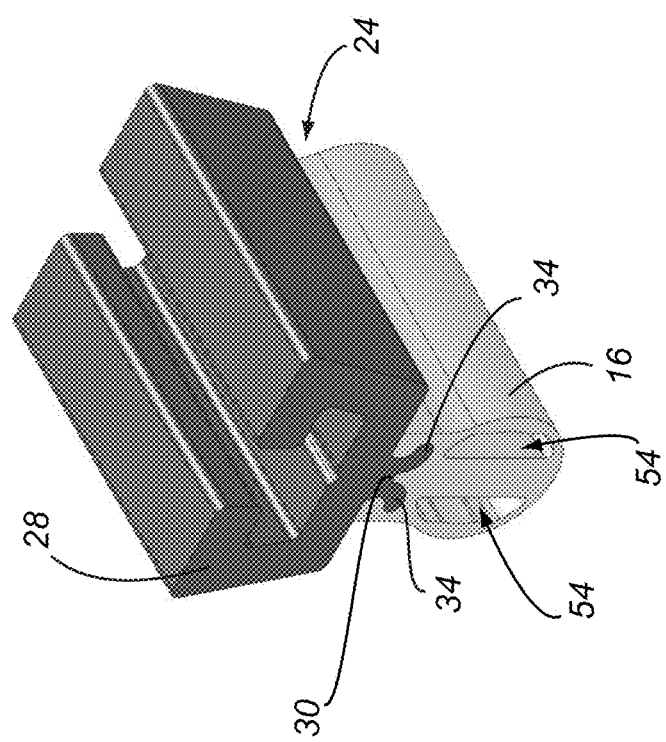
FIG. 21B
FIG. 21A

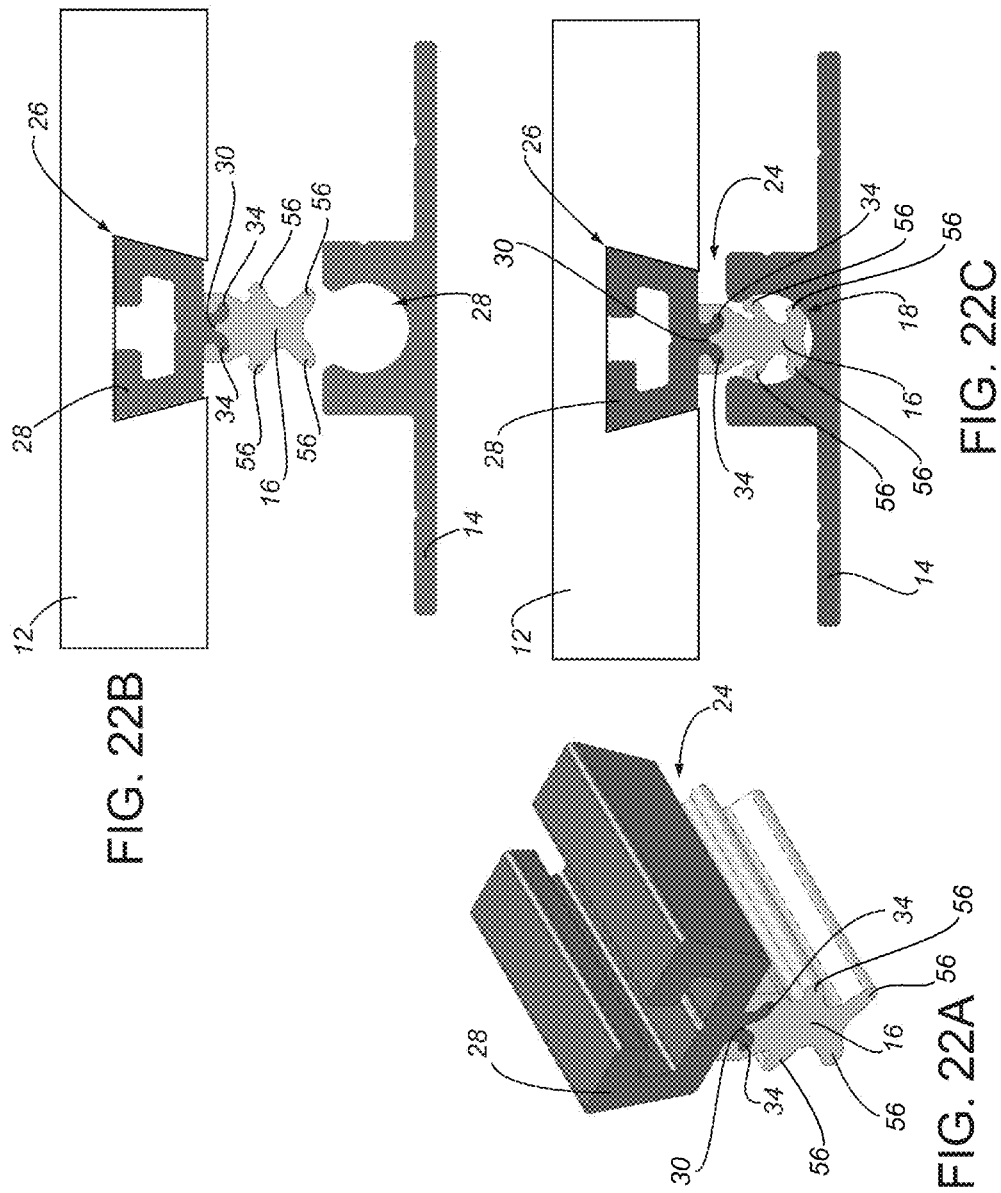

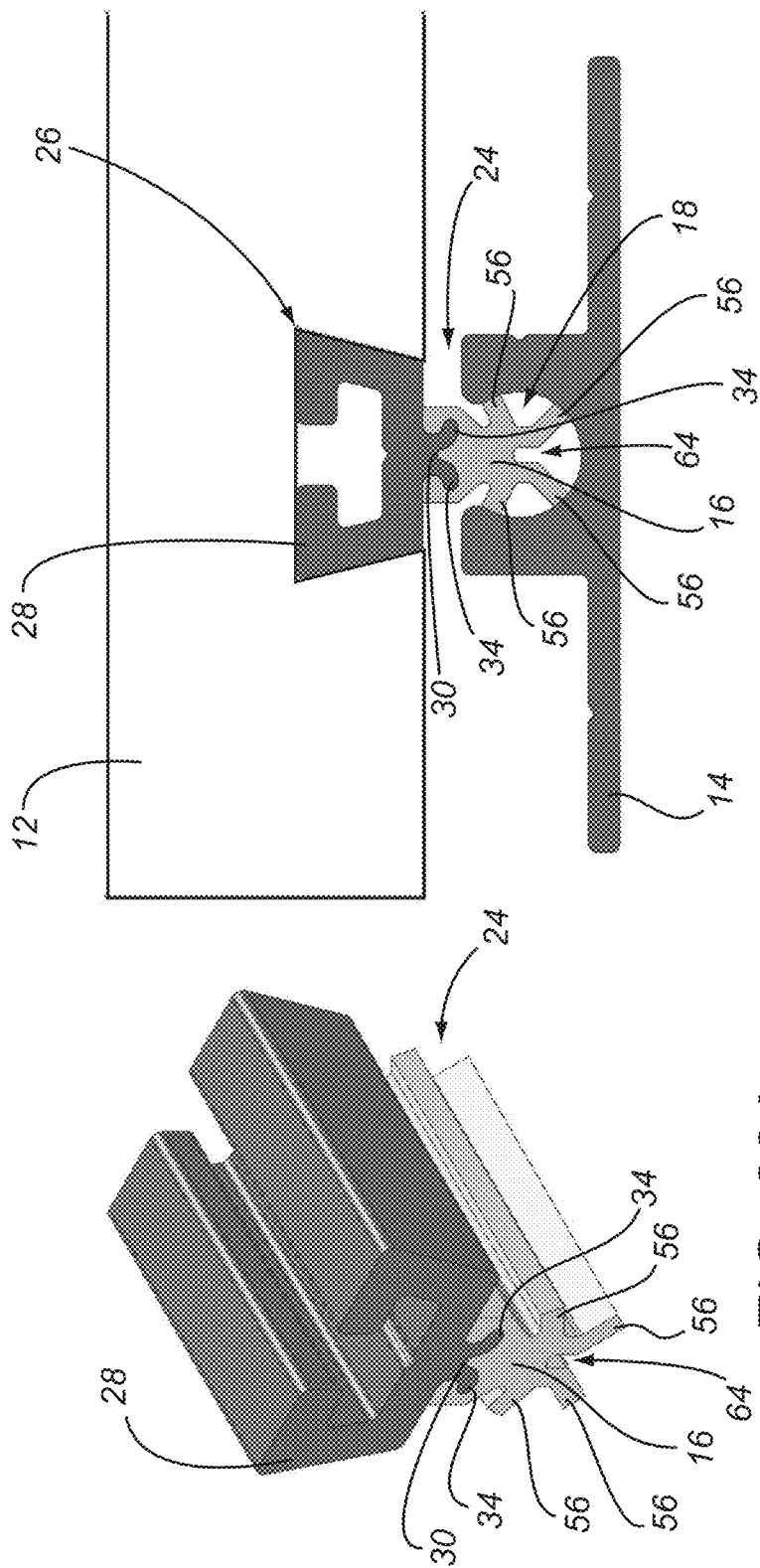

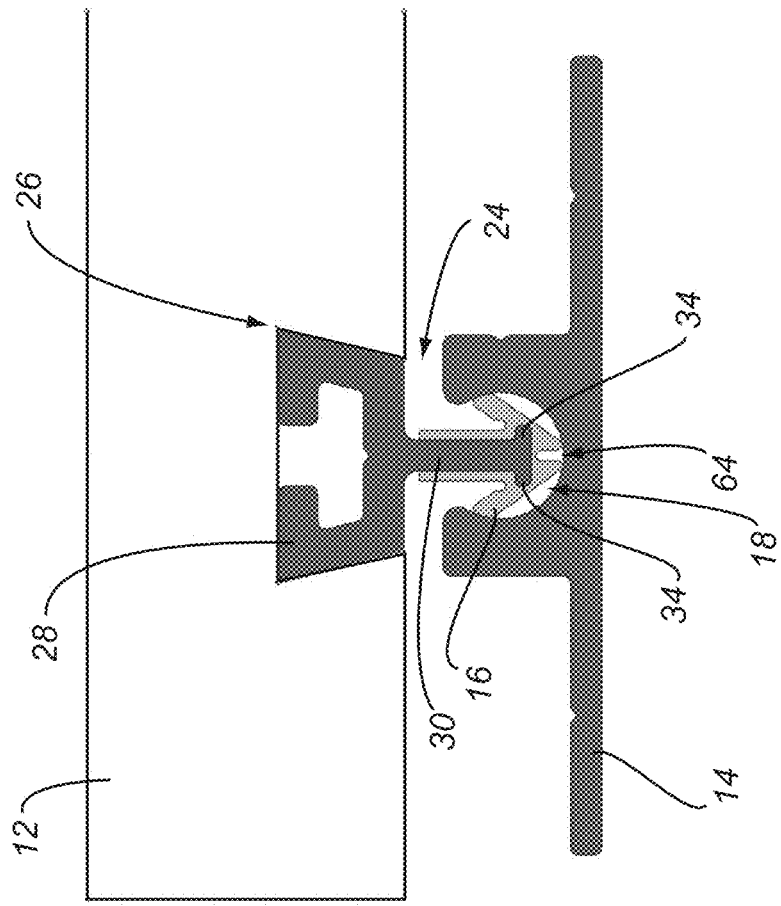
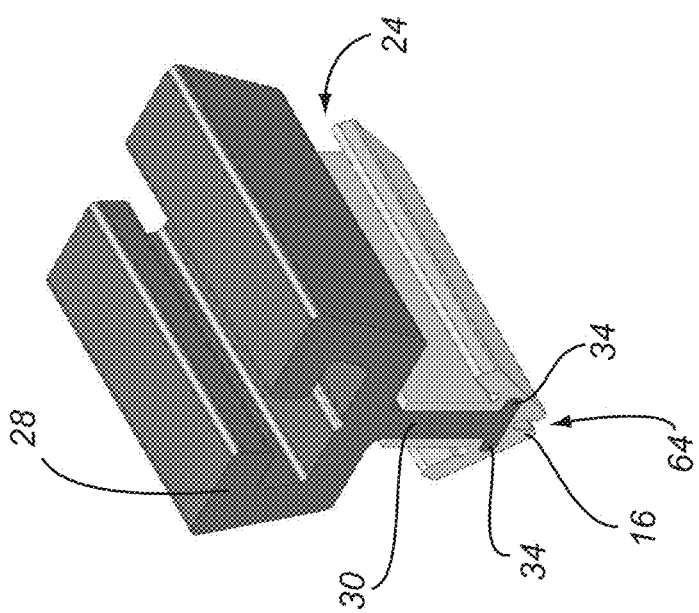
FIG. 24B
FIG. 24A

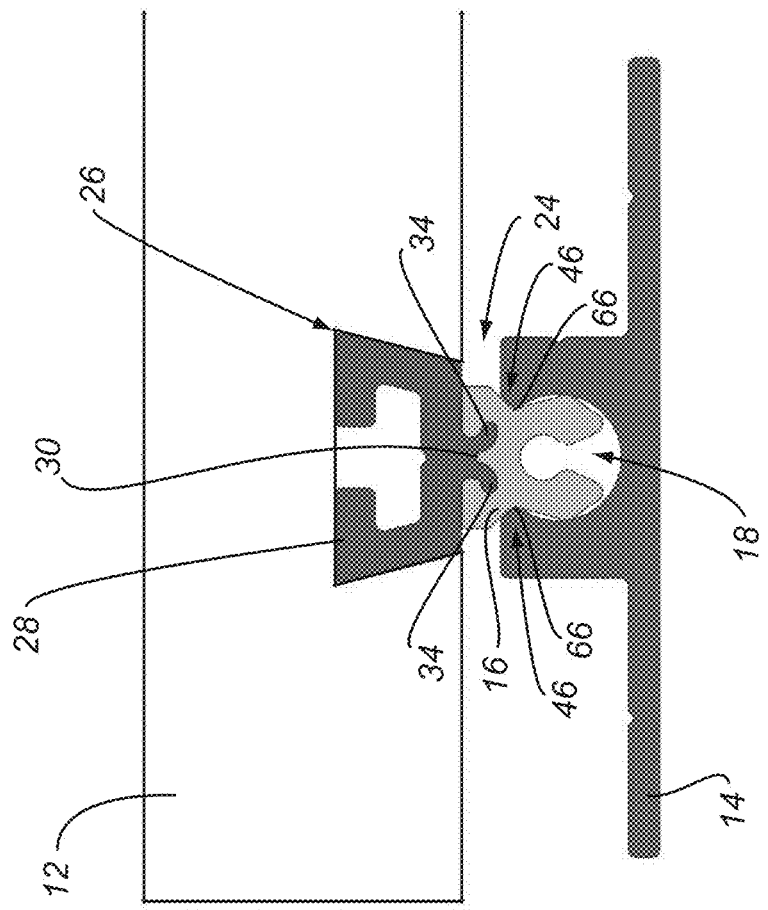
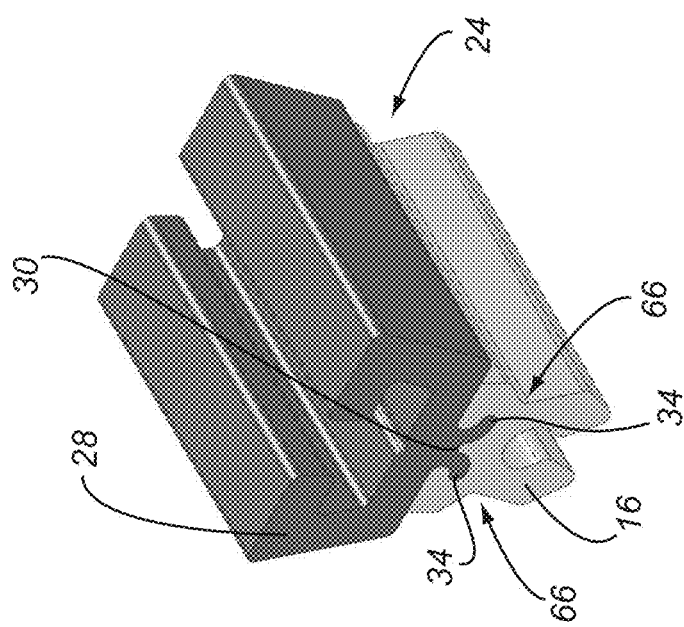
FIG. 25B
FIG. 25A

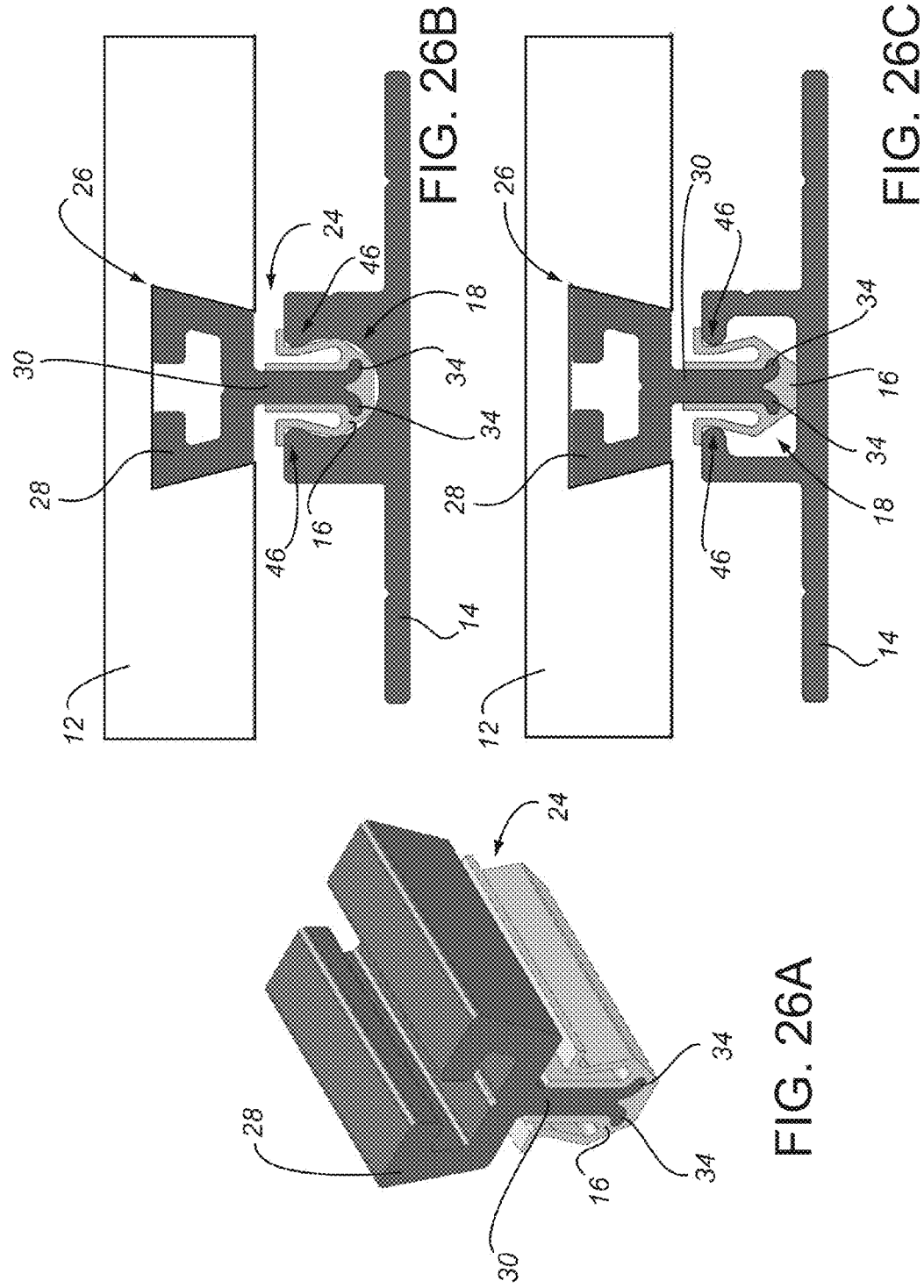

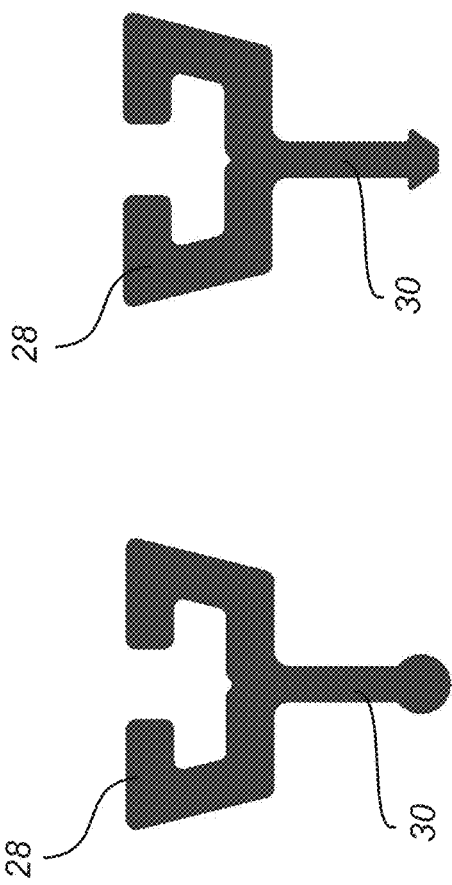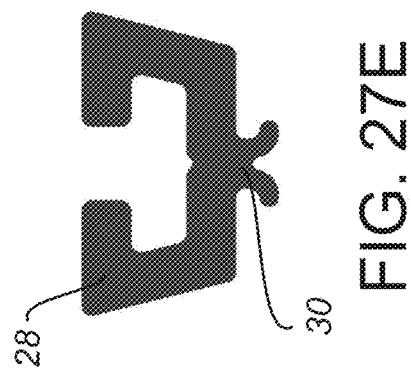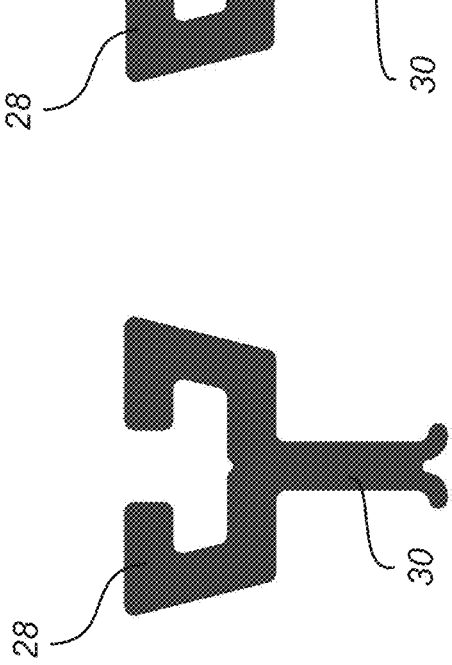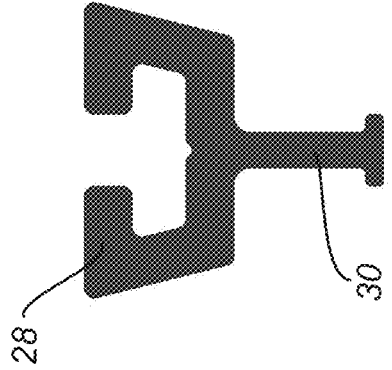

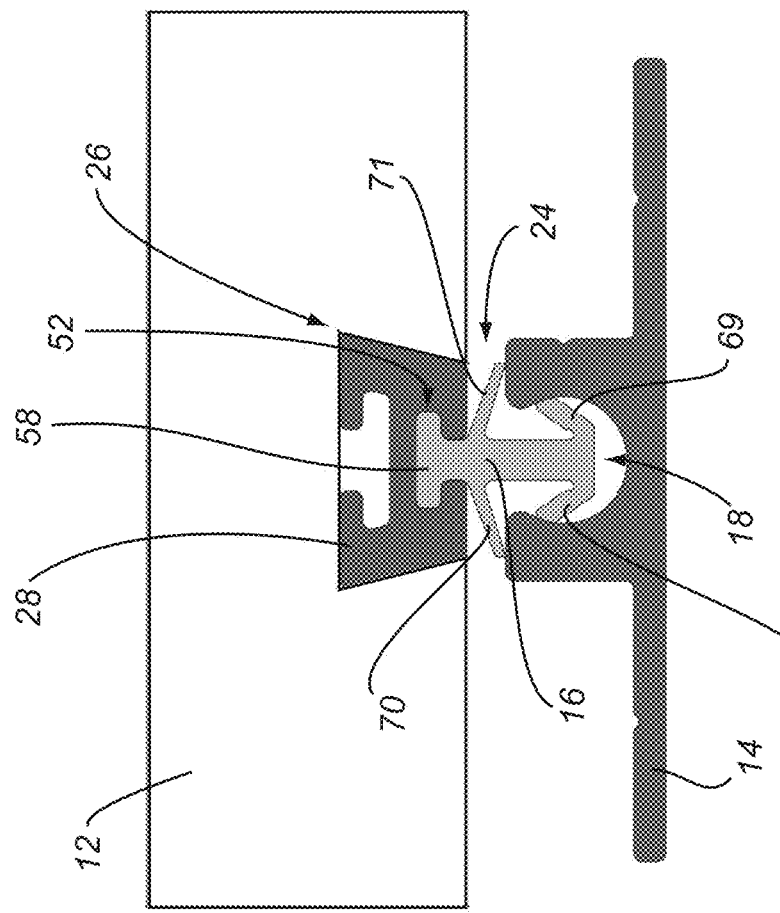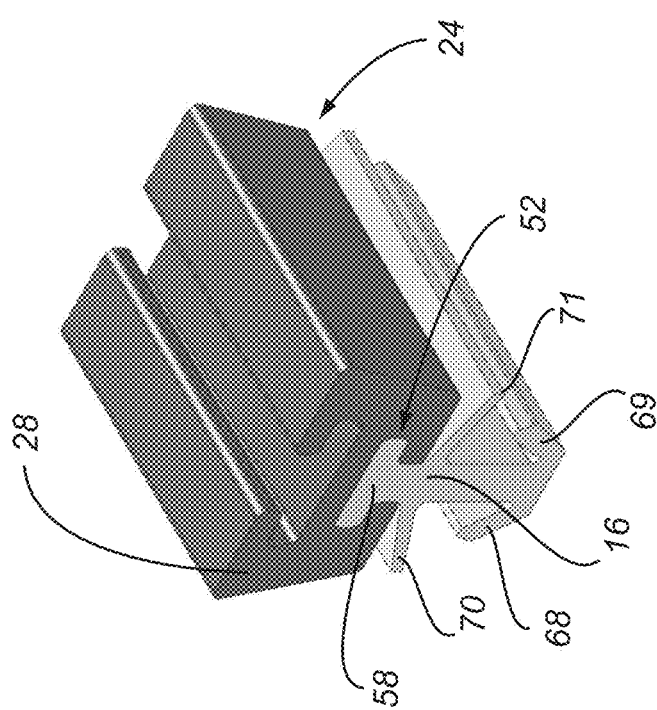

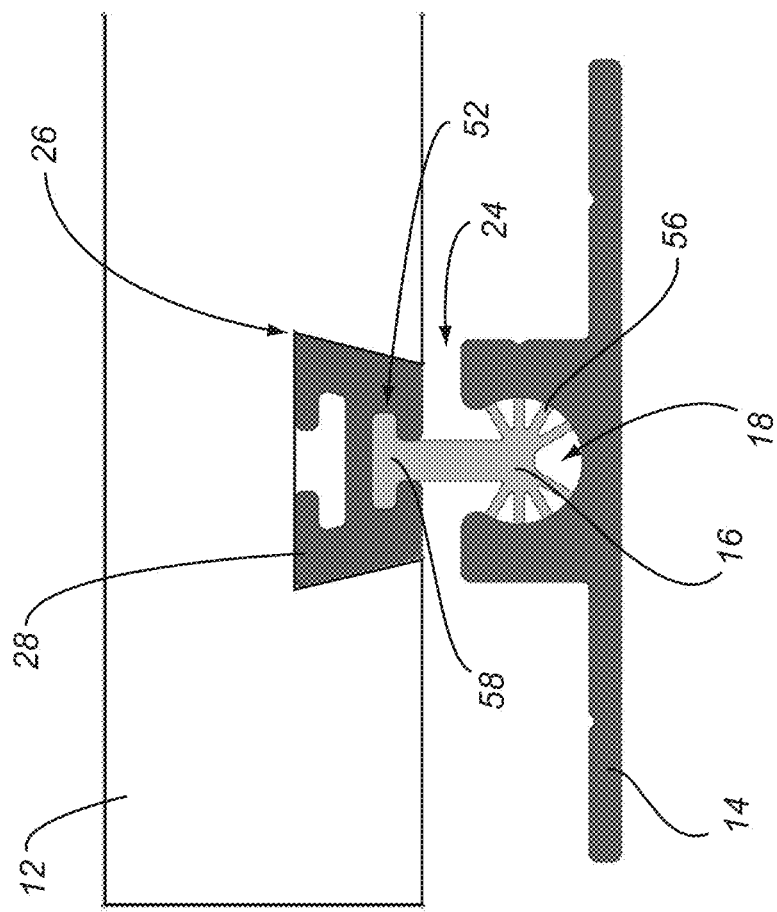
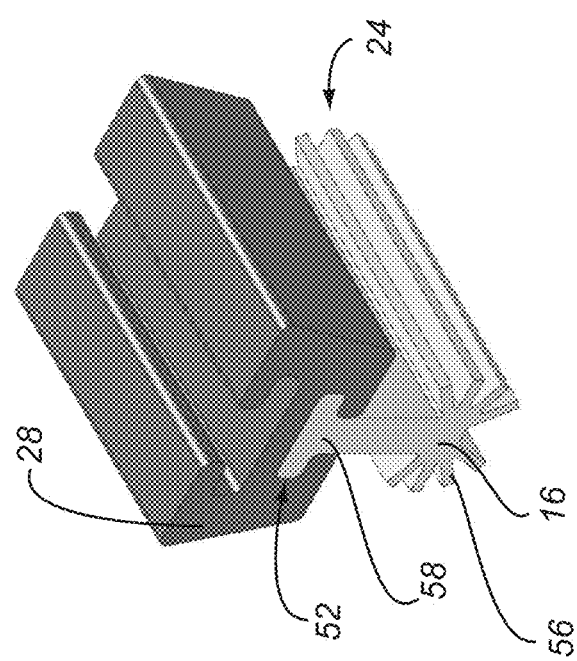
FIG. 29B
FIG. 29A

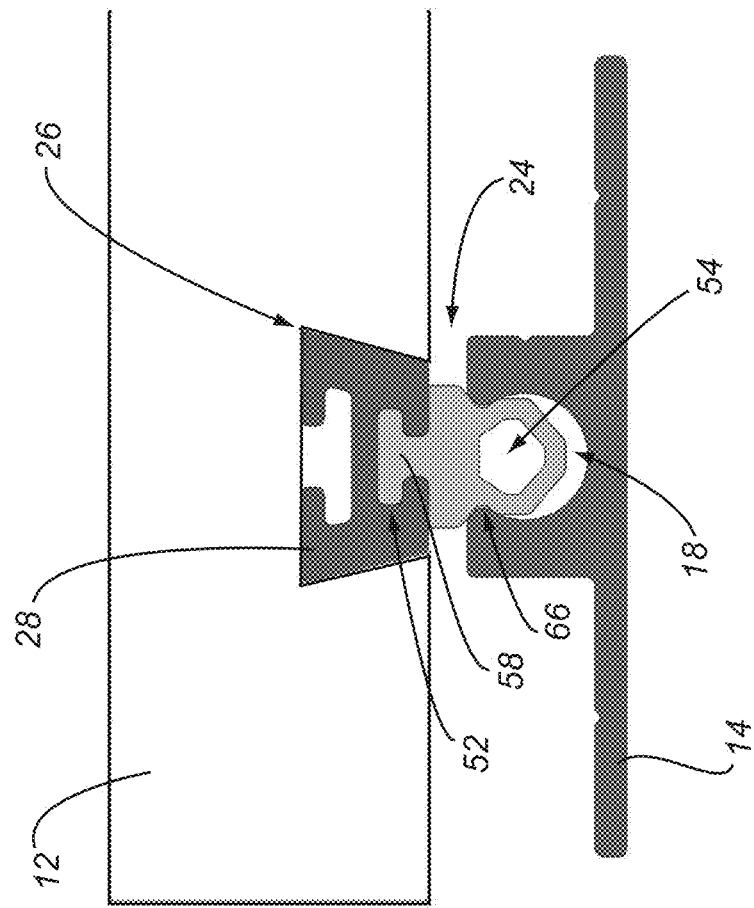
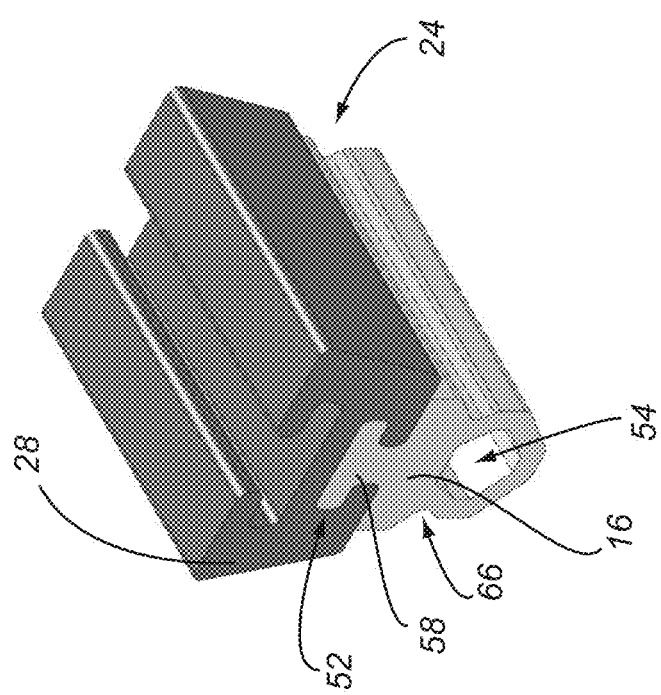
FIG. 31B
FIG. 31A

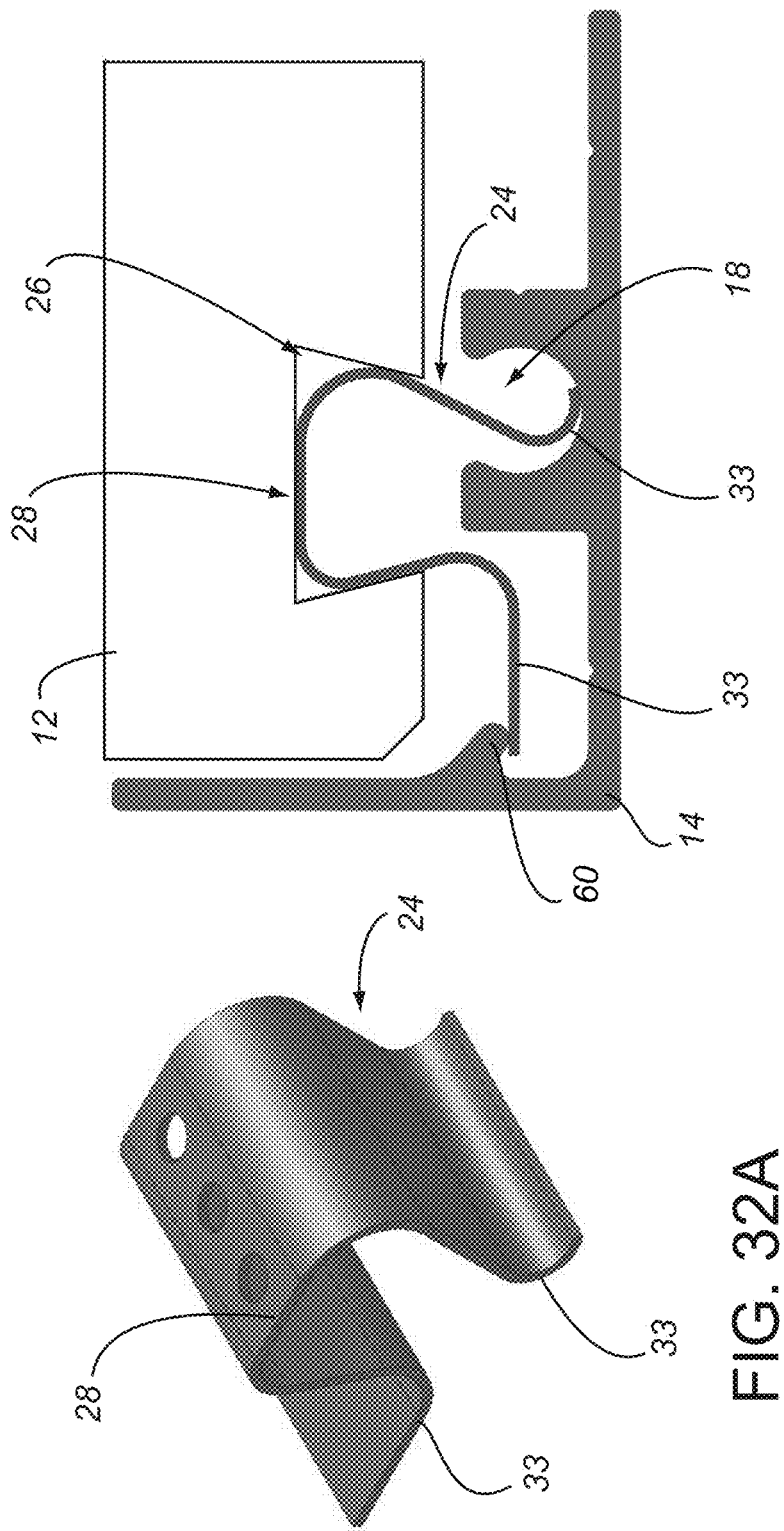

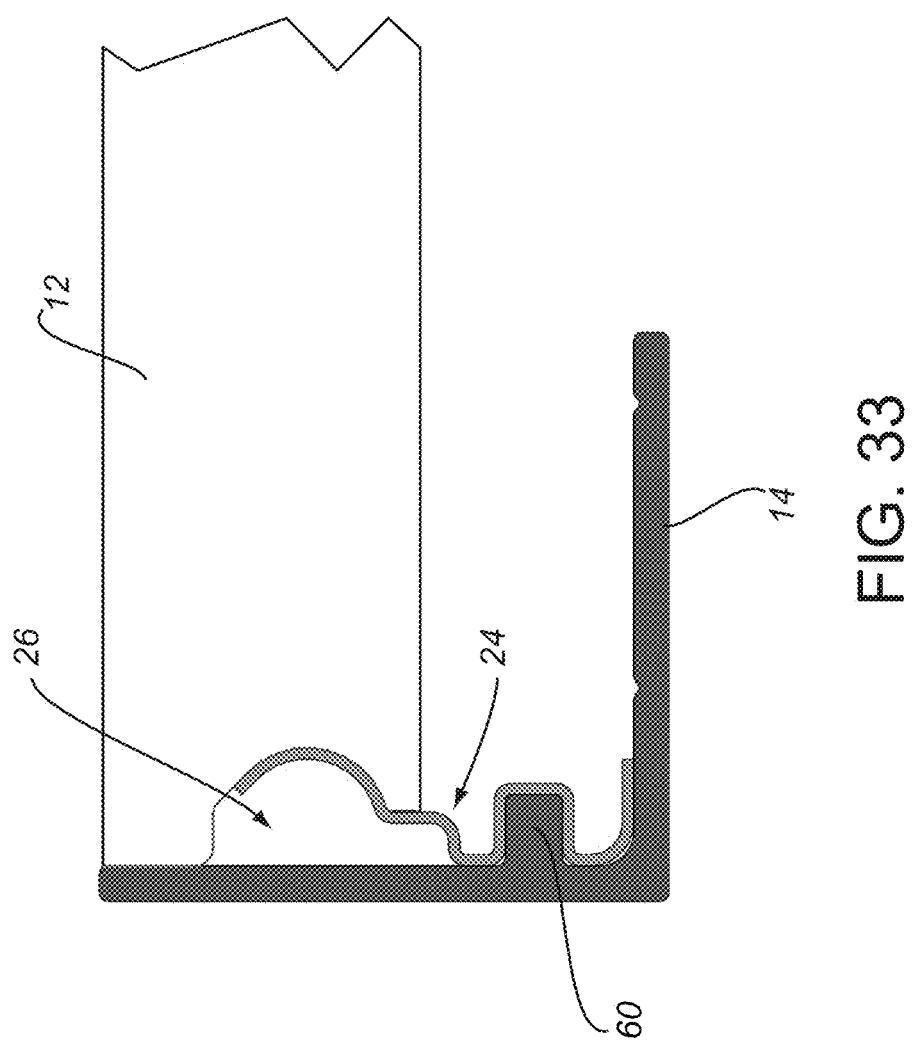

RETAINER AND PANEL WITH INSERT FOR INSTALLING WALL COVERING PANELS

RELATED APPLICATIONS

This application is a continuation-in-part of U.S. patent application Ser. No. 11/392,044, filed Mar. 29, 2006 and entitled "Systems and Methods for Installing Panels," which claims the benefit of the filing date of U.S. Provisional Application Ser. No. 60/669,757, filed Apr. 8, 2005 and entitled "System and Method for Installing Wall Covering Panels," the entire contents of which are hereby incorporated by this reference.

RELATED FIELDS

This invention relates to systems and methods for installing one or more panels onto a wall or another surface. More particularly, this invention relates to systems and methods for installing one or more modular panels onto a wall or other surface in a removable fashion.

BACKGROUND

Various wall covering systems are known in which a number of panels are installed onto a substrate to create a finished surface or other desired effects on the wall. Typically, installation of these panels occurs in a progressive manner. With progressive installation, the position of each panel is determined by the position of the previously installed adjacent panel and the adjacent panels are attached to one another. For example, a tongue extending from one edge of a panel can connect to an attachment structure in an adjacent panel to lock the two panels together.

There are drawbacks associated with progressive installation. For example, once the panels are installed, replacing, rearranging or changing the orientation of the panels is relatively difficult. Since all of the panels are linked together, changing one panel may require many, if not all, of the panels to be removed and reinstalled.

SUMMARY

Unlike previous systems, the panel systems of the present invention are modular and may permit the removal and/or replacement of the panels without having to remove the adjacent panels.

In some embodiments, the system is a modular panel system that includes at least one panel retainer mounted to a substantially vertical surface and at least one panel connected to the panel retainer in a removable fashion. In this system, the interaction of at least one panel insert and at least one attachment structure facilitates connecting the panel to the panel retainer in a removable fashion.

More particularly, this invention relates to mounting a framework of panel retainers onto a wall or other substrate and positioning the panels to engage at least a portion of the panel retainers. Through such engagements, the panel retainers retain the panels in the desired position as dictated by the framework.

In some embodiments, the modular panel system is installed by: selecting an area on a substantially vertical surface; mounting one or more panel retainers to the substantially vertical surface in or proximate the selected area; and connecting one or more panels to the mounted panel retainers in a removable fashion by attaching one or more panel inserts with one or more attachment structures.

BRIEF DESCRIPTION OF THE DRAWINGS

FIG. 3 is a perspective view of one embodiment of a panel retainer for use in a modular panel system.

FIG. 3A is a side view of the panel retainer shown in FIG. 3.

FIG. 4 is a perspective view of another embodiment of a panel retainer for use in a modular panel system.

FIG. 4A is a side view of the panel retainer shown in FIG. 4.

FIG. 5 is a perspective view of yet another embodiment of a panel retainer for use in a modular panel system.

FIGS. 15A and 15B are views of another embodiment of a panel insert for use in embodiments of a modular panel system of the present invention.

FIGS. 16A and 16B are views of another embodiment of a panel insert for use in embodiments of a modular panel system of the present invention.

FIGS. 19A and 19B are views of another embodiment of a panel insert for use in embodiments of a modular panel system of the present invention.

FIGS. 21A and 21B are views of another embodiment of a panel insert for use in embodiments of a modular panel system of the present invention.

FIGS. 22A-C are views of another embodiment of a panel insert for use in embodiments of a modular panel system of the present invention.

FIGS. 23A and 23B are views of another embodiment of a panel insert for use in embodiments of a modular panel system of the present invention.

FIGS. 24A and 24B are views of another embodiment of a panel insert for use in embodiments of a modular panel system of the present invention.

FIGS. 25A and 25B are views of another embodiment of a panel insert for use in embodiments of a modular panel system of the present invention.

FIGS. 26A-C are views of another embodiment of a panel insert for use in embodiments of a modular panel system of the present invention.

FIGS. 27A-E are views of other embodiments of base profiles for use in embodiments of a modular panel system of the present invention.

FIGS. 28A and 28B are views of another embodiment of a panel insert for use in embodiments of a modular panel system of the present invention.

FIGS. 29A and 29B are views of another embodiment of a panel insert for use in embodiments of a modular panel system of the present invention.

FIGS. 31A and 31B are views of another embodiment of a panel insert for use in embodiments of a modular panel system of the present invention.

FIGS. 32A and 32B are views of another embodiment of a panel insert for use in embodiments of a modular panel system of the present invention.

FIG. 33 is a view of another embodiment of a panel insert for use in embodiments of a modular panel system of the present invention.

DETAILED DESCRIPTION OF THE DRAWINGS

Figure 1:
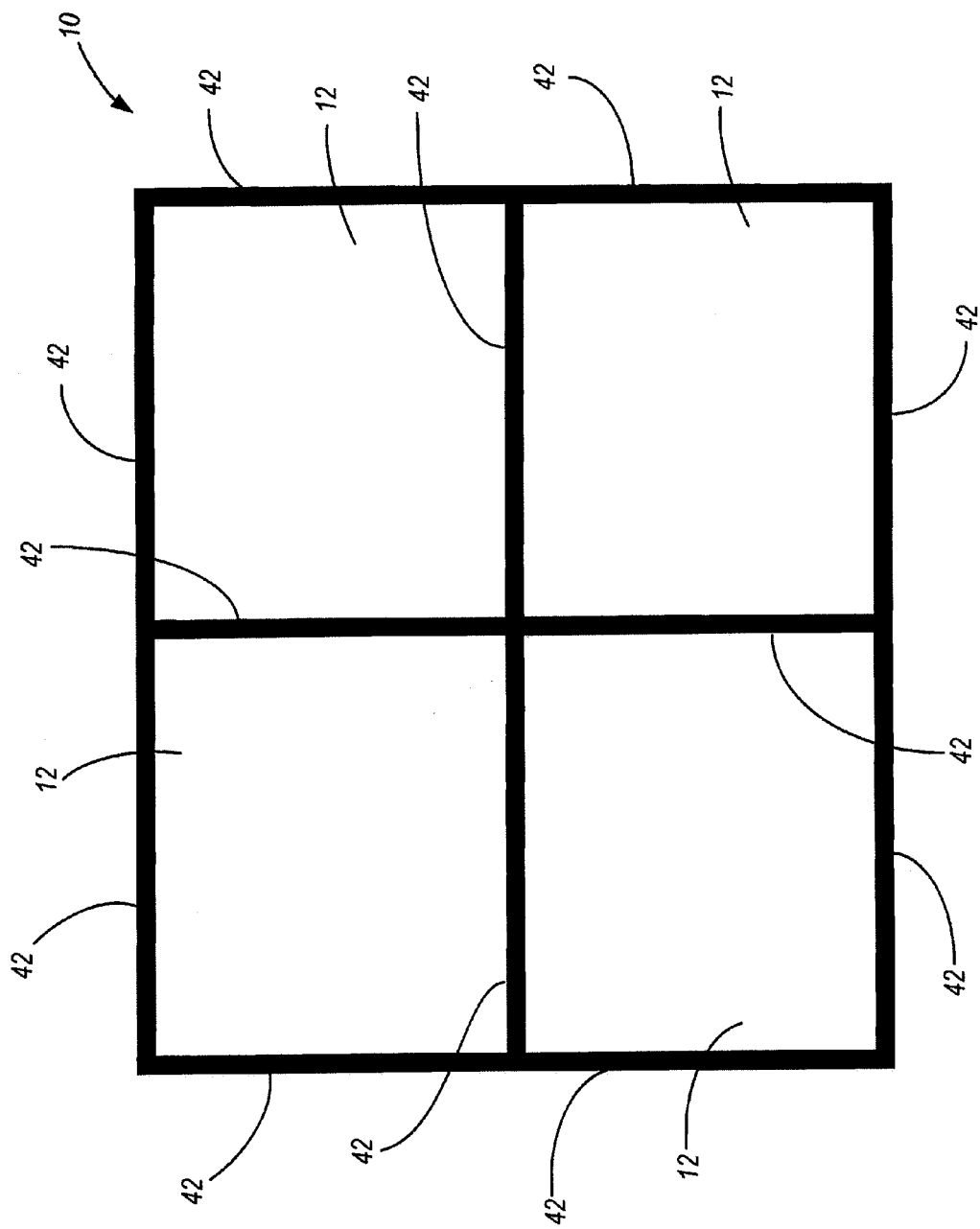
FIG. 1 schematically shows a modular panel system in accordance with embodiments of the present invention.

The Figures illustrate embodiments of modular panel systems 10 within the scope of the present invention. Using the modular panel systems 10 shown, an installer can secure one or more panels to a wall or other substrate in a modular and removable manner. Although not shown in the Figures, the front surfaces of the panels may include graphics or text (such as advertising, marketing, presentation or other media), or may simply have a plain or ornamental appearance (whether patterned, colored, textured or otherwise). Whether the panels include graphics, or simply have a plain or ornamental appearance, the panels may be finished using any conventional or non-conventional technique. For example, the panels may be primed, painted, printed, sealed, or treated in other manners to yield smooth or textured finishes for either indoor or outdoor applications. Using the modular panels, various shapes and sizes of wall coverings can be created.

The wall panels are preferably, but do not have to be, formed from a substrate (such as medium density fiberboard) onto which a finish (such as a textile (e.g., carpet, fabric, etc.), paint, paper, sealer etc.) is applied. Alternatively, wall panels 12 can be formed from other materials and in other manners. For example, wall panels 12 may be wood, wood veneer, glass, plastic, metal, concrete, or formed from other materials or combinations of materials. In some embodiments, wall panels 12 may include certain advantageous properties, such as acoustical, fire retardant, insulating, or other properties.

The systems 10 shown in the Figures generally include the panels 12, various types of panel retainers 14, 36, and 38, attachment structures 18, and deformable bodies 16. The deformable bodies 16 interact with and engage the attachment structures 18 to secure the panels 12 to the panel retainers. In the embodiments shown in the Figures, the attachment structures 18 are formed in the panel retainers and the deformable bodies 16 extend from rear surfaces of the panels 12. In other embodiments, however, panels 12 may include the attachment structures 18 and the panel retainers may include the deformable bodies 16.

Figure 2:
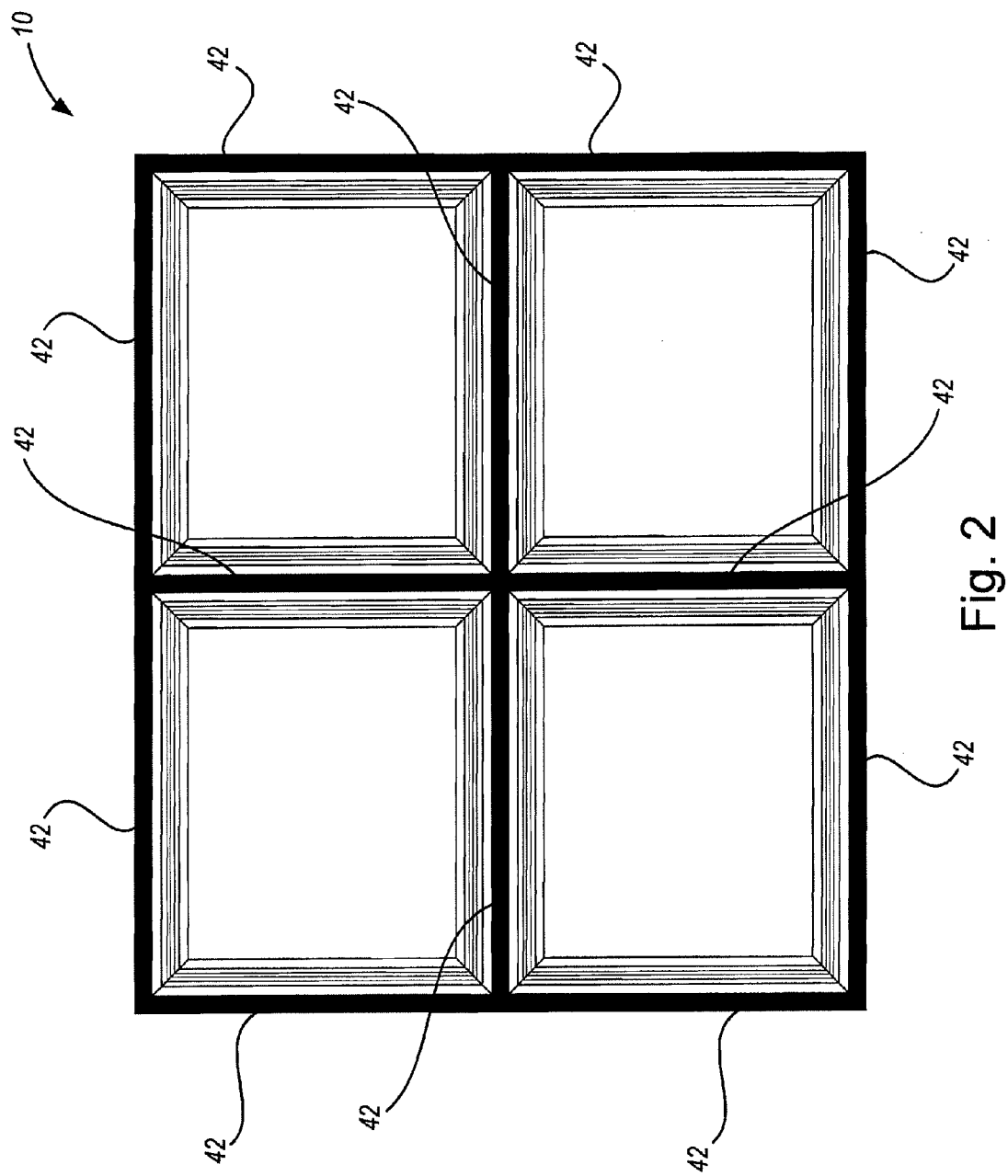
FIGS. 2 and 2A both schematically shows the modular panel system of FIG. 1 with the panels removed.
Figure 2A:
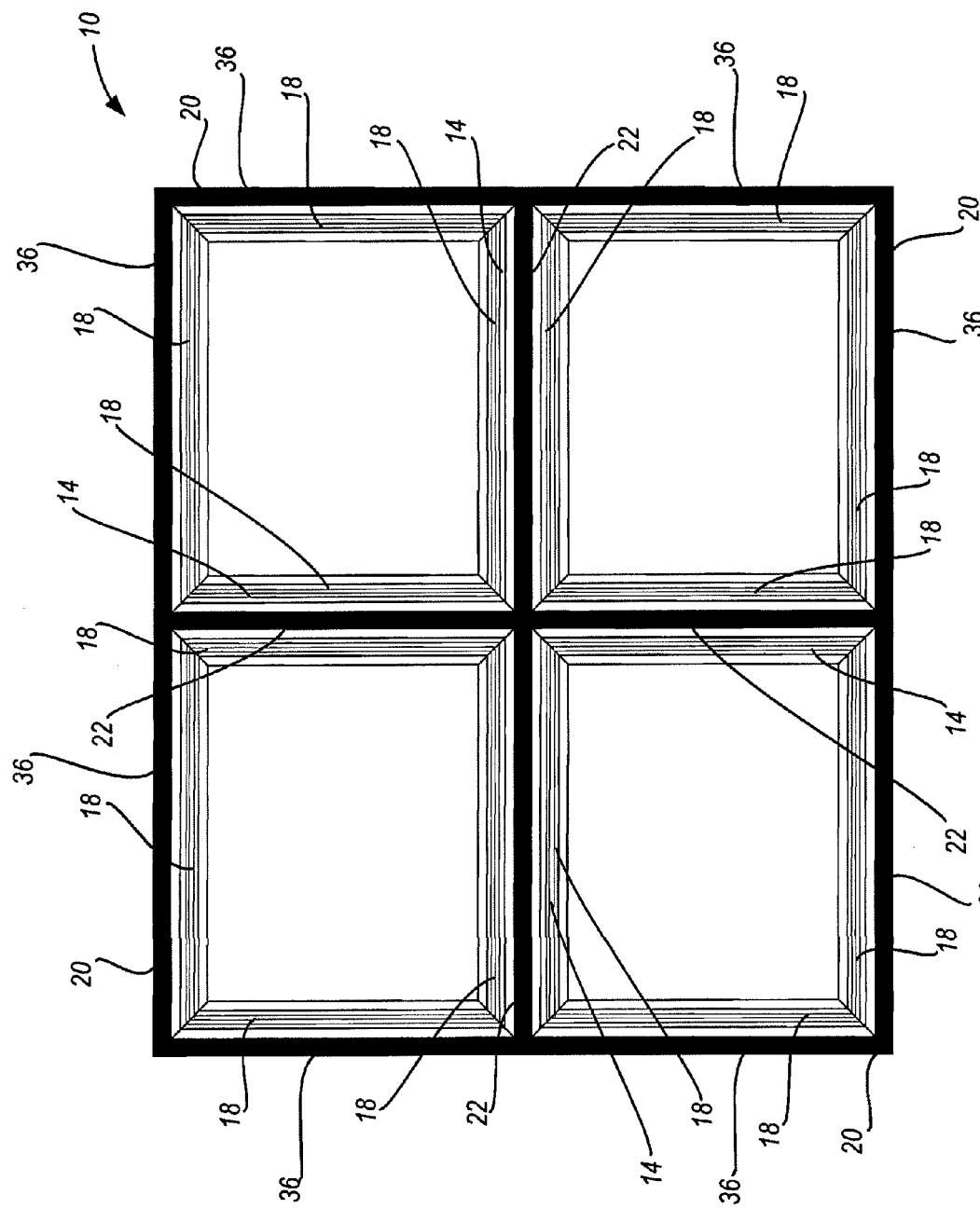

FIG. 1 schematically illustrates an installed four-panel system 10 having a framework of panel retainers (generally indicated in FIGS. 1 and 2 by reference 42). FIGS. 2 and 2A schematically show the framework of panel retainers with the modular panels 12 removed. While the frame shown in FIG. 2 may be integrally-formed, it may also be formed from a number of individual panel retainers that are assembled and mounted on the wall to form the frame.

FIGS. 3-9 illustrate different embodiments of panel retainers that may be used to form the desired framework to support modular wall panels 12. The panel retainers shown in these Figures include an attachment structure 18, in the shape of a groove formed in a base wall 44 of the panel retainer. Other shaped attachment structures, including protrusions rather than grooves are possible, and are within the scope of the present invention. Further, although the attachment structures 18 shown in these Figures include semi-circular cross sections, other shaped grooves are also possible, and are within the scope of the present invention. The attachment structure 18 may be formed of any shape to mate with the structure on or associated with the modular panels 12 and thereby retain the panels 12 to the wall. In use, the panel retainers are mounted by their base walls 44 to the wall or other substrate so that the groove(s) are exposed for mating with panels 12. The panel retainers are preferably formed of extruded aluminum, but may alternatively be formed of any material having sufficient strength and rigidity to support the panels.

The panel retainers shown in FIGS. 3-9 have different structures and features depending on their intended placement in the installation.

For example, the panel retainer 36 shown in FIGS. 3 and 3A includes a single attachment structure 18 (illustrated as a groove) and an upstanding edge 20. The panel retainer 36 may be placed around the perimeter of the panel installation so that the edges of the modular panels 12 are shielded from view by the upstanding edge 20. In this way, the edges 20 of the panel retainers 36 may form an aesthetically pleasing frame around the entire installation of panels 12. In other embodiments, it is unnecessary to include an upstanding edge 20 around the panels 12 or otherwise frame them.

Figure 3B:
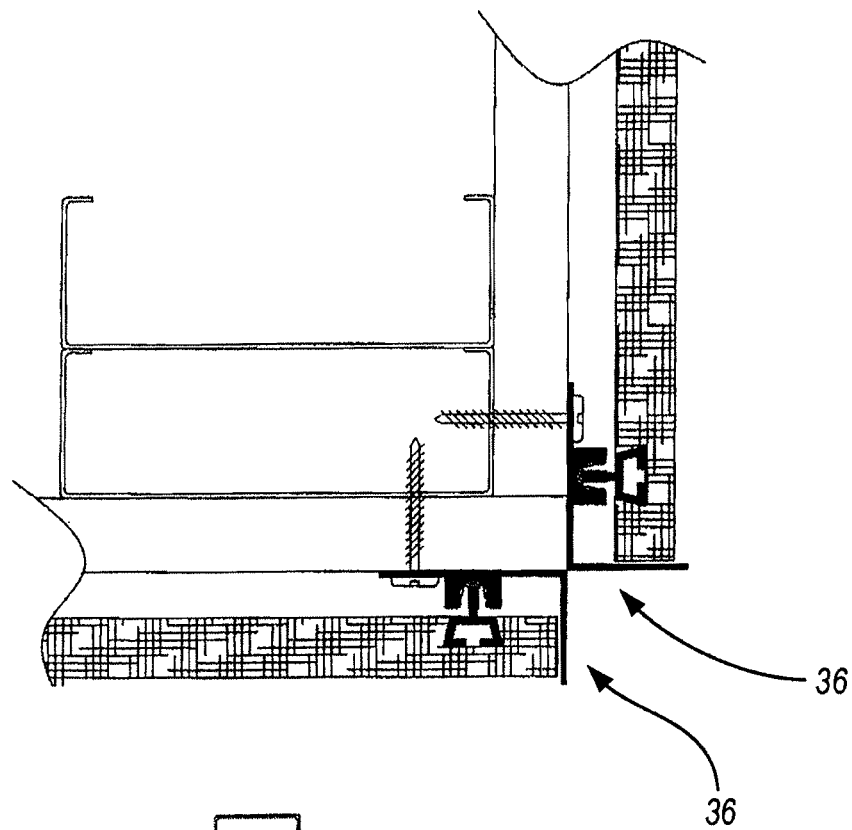
FIG. 3B schematically shows part of a modular panel system that includes the panel retainer shown in FIG. 3.
Figure 3C:
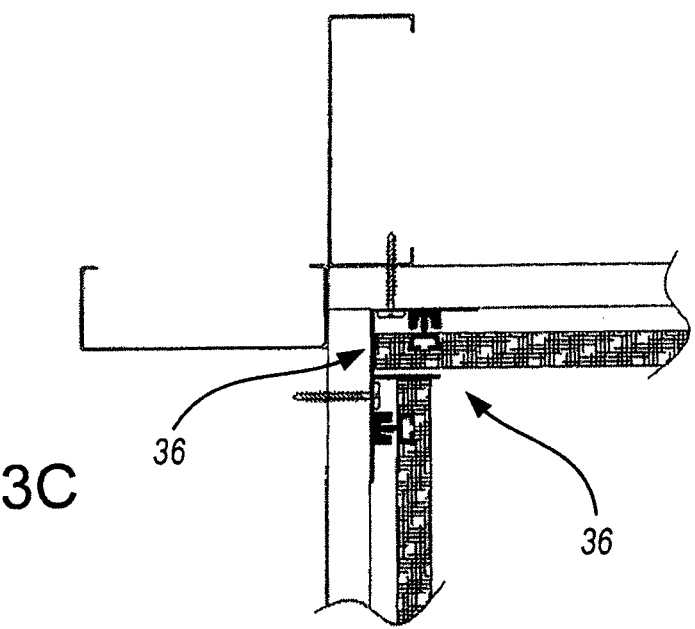
FIG. 3C schematically shows part of a modular panel system that includes the panel retainer shown in FIG. 3, shown installed in a different configuration than FIG. 3B.

As shown in FIGS. 3B and 3C, the panel retainers 36 may be particularly useful when positioning panels 12 at the outside and inside corners of walls.

FIGS. 4 and 4A show another type of panel retainer 14 useable with the modular panel system 10. The panel retainer 14 shown in these Figures includes two attachment structures 18 (illustrated as grooves) with an upstanding dividing edge 22 in between. Panel retainer 14 may be used to accommodate adjacent panels 12 in the installation. Each attachment structure 18 of the panel retainer 14 can engage a separate panel 12. As shown schematically in FIG. 1, dividing edge 22 may visually frame each wall panel 12. In other embodiments, dividing edge 22 is unnecessary.

Figure 5A:
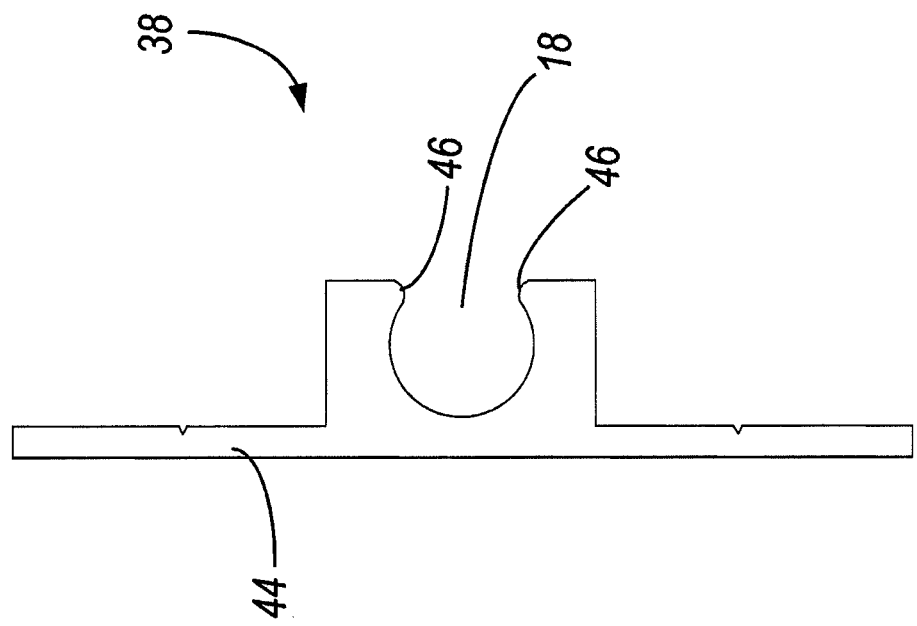
FIG. 5A is a side view of the panel retainer shown in FIG. 5.

FIGS. 5 and 5A show a third type of panel retainer 38 useable in the system 10. The panel retainer 38 shown in these Figures includes a single attachment structure 18 (illustrated as a groove) and is used when support of or attachment to the middle of a panel is desired.

The above-described panel retainers 14, 36 and 38, or other types of panel retainers, may be used in a wide variety of numbers and configurations to create an underlying support frame/structure for receiving and supporting the panels 12 in a wide variety of combinations, orientations and configurations. For example, as schematically shown in FIG. 2A, panel retainers 14 are used to from the inner t-shaped portion of the panel retainer framework and panel retainers 36 define the perimeter of the framework.

The panel retainers 14, 36 and 38 shown, and/or other types of panel retainers, may be formed in any shape or size. For example, the panel retainers can be formed in any desired width, depth or length. Moreover, the panel retainers used in an installation do not need to be of uniform dimension. For example, in some embodiments, different panel retainers may have different depths such that the modular panels are non-uniform in their spacing from the wall, potentially giving greater prominence to some of the panels than others or creating other effects.

Figure 6:
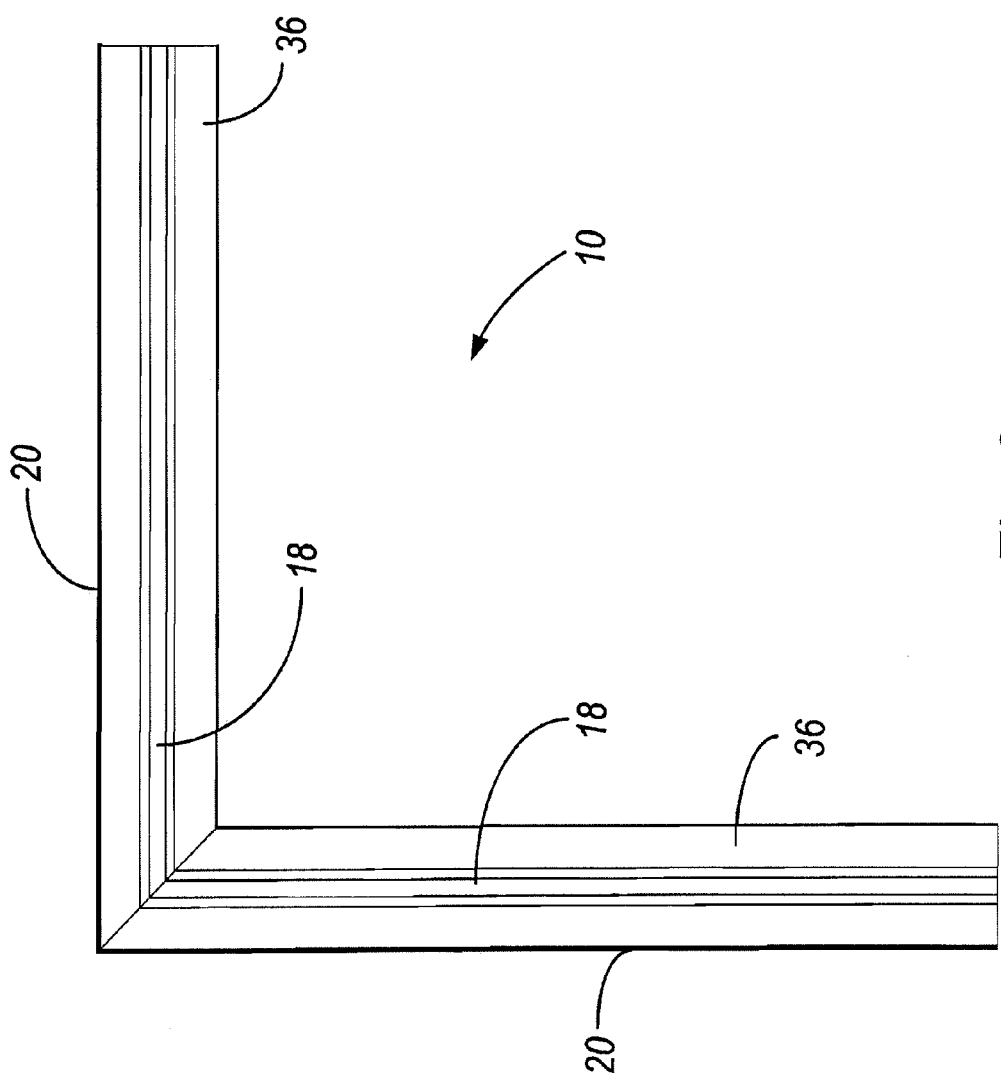
FIG. 6 shows panel retainers, similar to the panel retainer shown in FIG. 3, joined together to form a corner piece.
Figure 7:
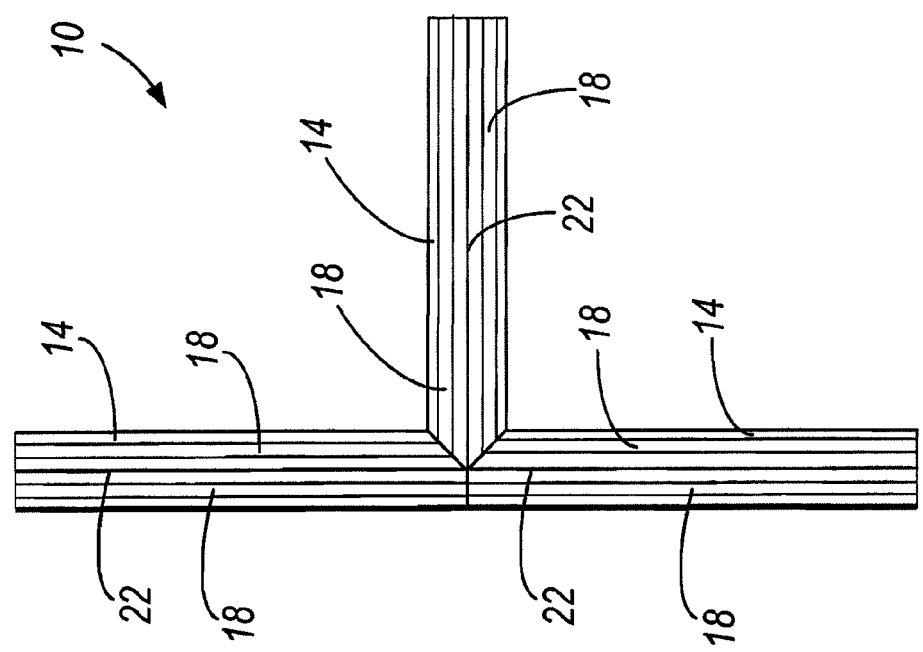
FIG. 7 shows panel retainers, similar to the panel retainer shown in FIG. 4, joined together to form a three-way intersection.
Figure 8:
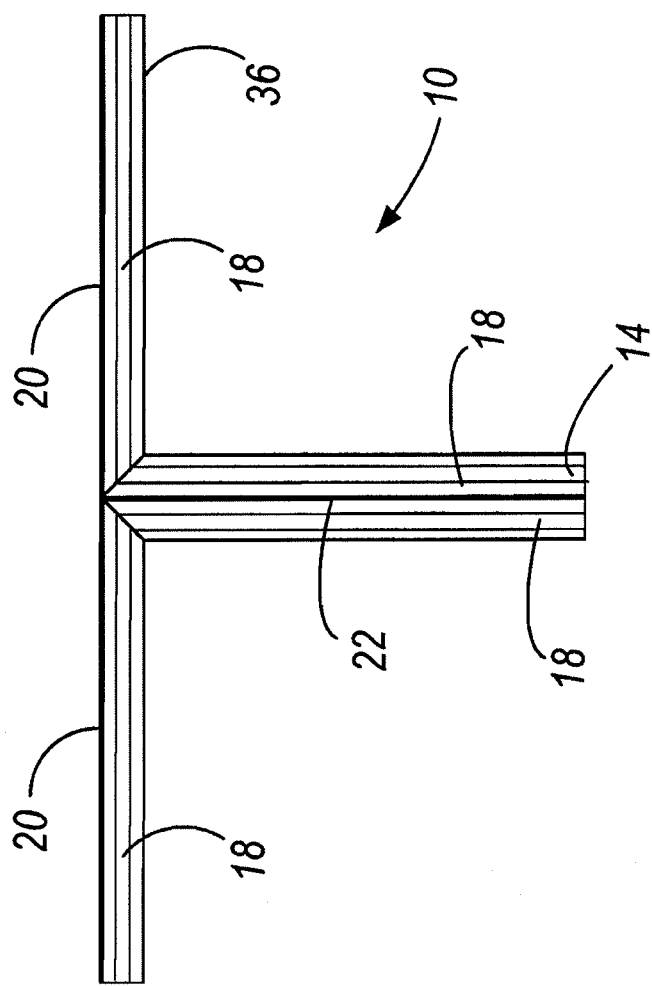
FIG. 8 shows panel retainers, similar to the panel retainers shown in FIGS. 3 and 4, joined together to form a different three-way intersection.
Figure 9:
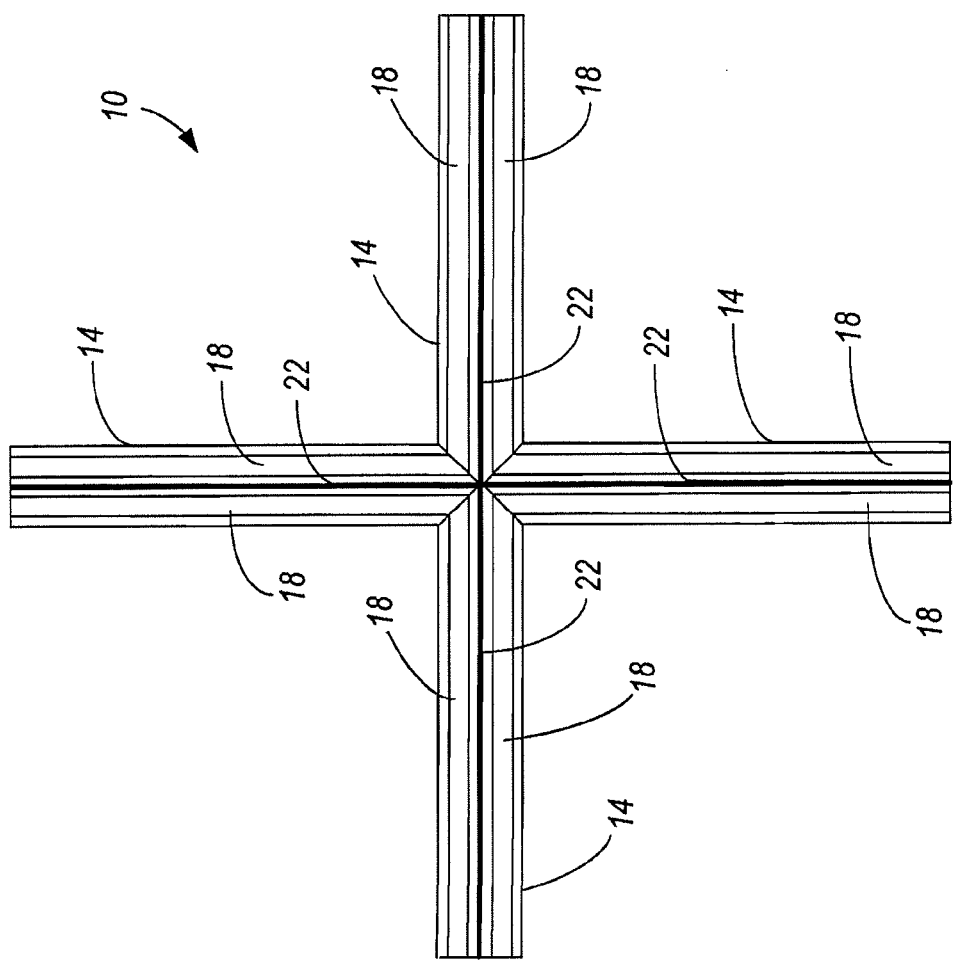
FIG. 9 shows panel retainers, similar to the panel retainer shown in FIG. 4, joined together to form a four-way intersection.

As shown in FIGS. 6-9, panel retainers 14, 36 and 38 may be joined to one another in a wide variety of configurations. FIG. 6 shows two panel retainers 36 with mitered corners such that they are joined together at a right angle. FIG. 7 shows three panel retainers 14 with mitered ends joined to one another. FIG. 8 also shows a three-way intersection, but the configuration of FIG. 8 includes two panel retainers 36 and a panel retainer 14. FIG. 9 shows four panel retainers 14 with mitered portions joined to one another.

Although the Figures generally show panel retainers positioned at 90° or 180° with respect to one another, other orientations are also possible. For example, if modular panels 12 are diamonds, octagons, or other shapes or combination of shapes, it may be necessary or desirable to join or dispose the panel retainers at angles other than 90° or 180° to one another. In still other embodiments, it is unnecessary to miter the ends or other portions of panel retainers 14, 36 and 38.

In some embodiments, some or all of the panel retainers 14, 36 and/or 38 may be physically connected to one another to form a structural unit. Such connections may be welded, snap-fitted, channel locked, bonded or joined by any other mechanical or chemical means for connecting the panel retainers. In other embodiments, panel retainers are not physically connected at the joints. Rather the panel retainers may be connected to the wall as individual units in appropriate locations to define the frame. In other embodiments, the panel retainers may be physically connected to one another after they are connected to the wall. In still other embodiments, it is unnecessary to form joints between the panel retainers and/or the panel retainers do not need to extend the entire length of the side and/or the perimeter of panels 12.

The panel retainers may be installed on a variety of types of surfaces, including, but not limited to, drywall, sheet rock, plaster, concrete or block walls, wooden walls, bare wall joists, etc. The system need not be used only on absolutely planar surfaces. Rather, shimming or other techniques may be used to adapt the system for use on non-planar surfaces as well.

The panel retainers may be secured to the wall using any means sufficient to impart stability to the panel retainers so as to enable them firmly to support the wall covering panels 12. Screws, nails, rivets, adhesives or other mechanical, chemical or other types of fasteners may be used to secure panel retainers 14, 36 and 38 to a wall in a permanent or semi-permanent fashion. In some embodiments, the panel retainers include screw holes to facilitate mounting them to the wall with screws passing through the holes and into the wall.

Once the panel retainers 14, 36 and/or 38 are installed to from the desired framework on the wall or other surface, the modular panels 12, which may be of almost any size and shape, may be mounted to the panel retainers.

Figure 13:
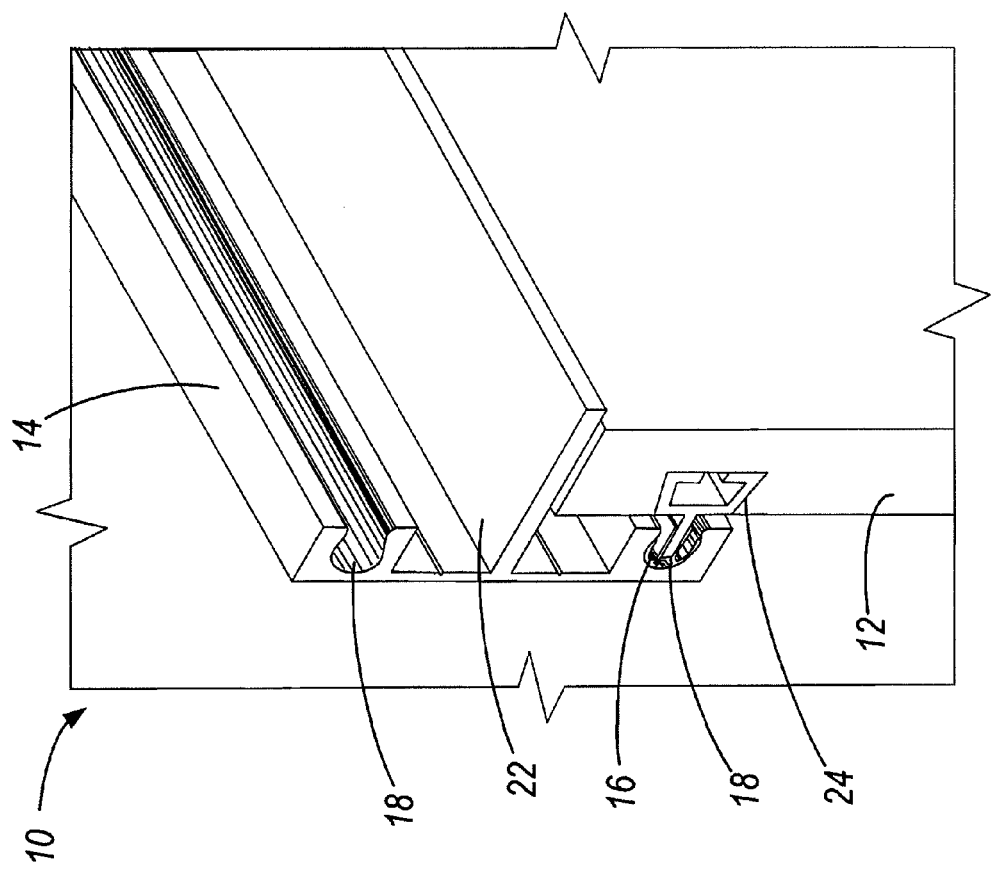
FIG. 13 partially shows a panel secured to a panel retainer by a panel insert in accordance with some embodiments of the present invention.
Figure 14B:
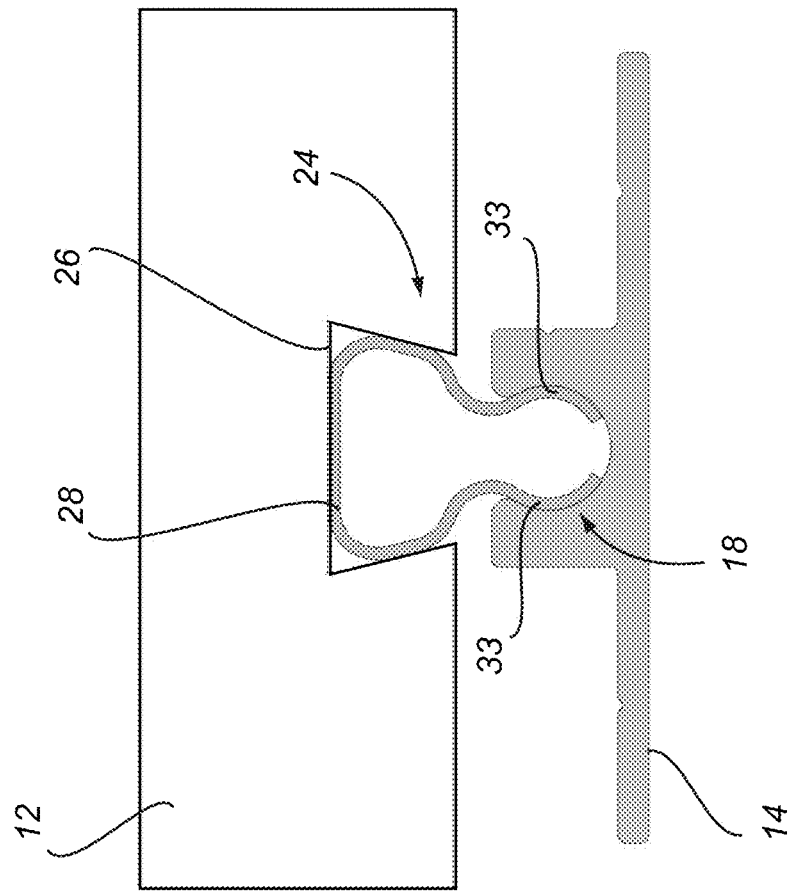
FIGS. 14A and 14B are views of another embodiment of a panel insert for use in embodiments of a modular panel system of the present invention.
Figure 14A:
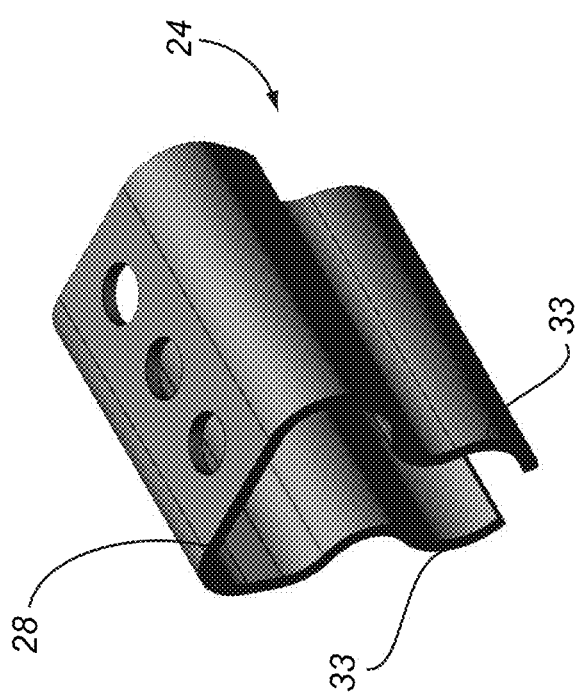

FIG. 13 shows a modular panel 12 secured to a panel retainer (in this Figure, a panel retainer 14) by the interaction of a deformable body 16 with an attachment structure 18 (in this embodiment, a groove). In the embodiment shown in FIG. 13, the wall panel 12 is associated with a deformable body and the attachment structure 18 is a groove formed in the panel retainer 14. Although only one deformable body 16 for engaging attachment structure 18 is shown in FIG. 13, a plurality of deformable bodies may be used to secure the wall panel 12 to the panel retainer. The deformable body 16 shown in FIG. 13 is part of an insert 24 that is received in a channel 26 formed in the back of modular panel 12. The channel 26 shown in FIG. 13 is dovetail-shaped; however, channels may be different shapes or configurations to receive corresponding shaped and/or configured inserts 24 in sliding or other fashions.

Figure 12:
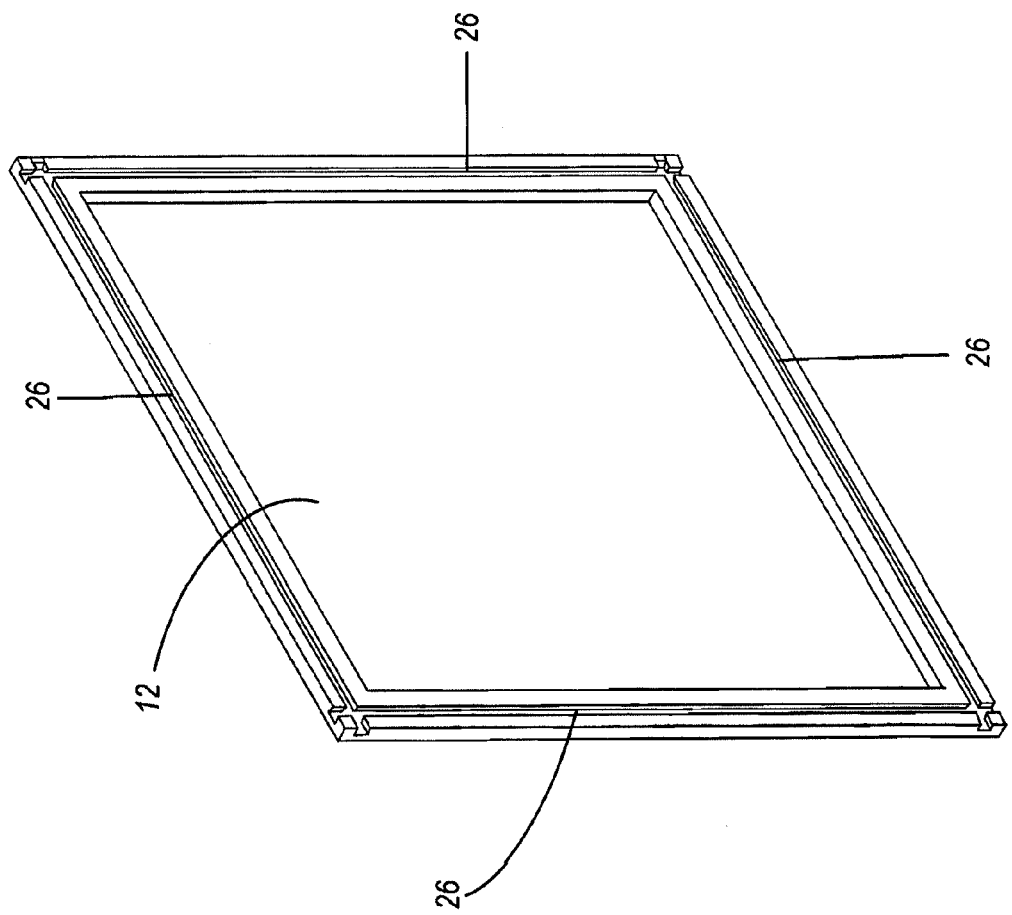
FIG. 12 is a rear view of one embodiment of a panel for use in embodiments of a modular panel system of the present invention.

FIG. 12 shows the channels 26 formed in the back of modular panel 12. While channels 26 are shown positioned along every edge of the panel 12, they need not be. Rather, any number of channels 26 of any length may be formed on the panels 12 as long as they are positioned so that the panel inserts 24 they receive can be located to mate with the panel retainers installed on the wall. Furthermore, channels 26 can have any cross-sectional shape to allow for effective coupling with panel inserts 24. In other embodiments, channels 26 are unnecessary and the panel inserts 24 or other structures may be associated with the panels in other manners. For instance, in some embodiments, portions of the panel inserts 24 may be directly connected to the panel (such as by mechanical or chemical means) or formed integrally therewith.

Figure 10:
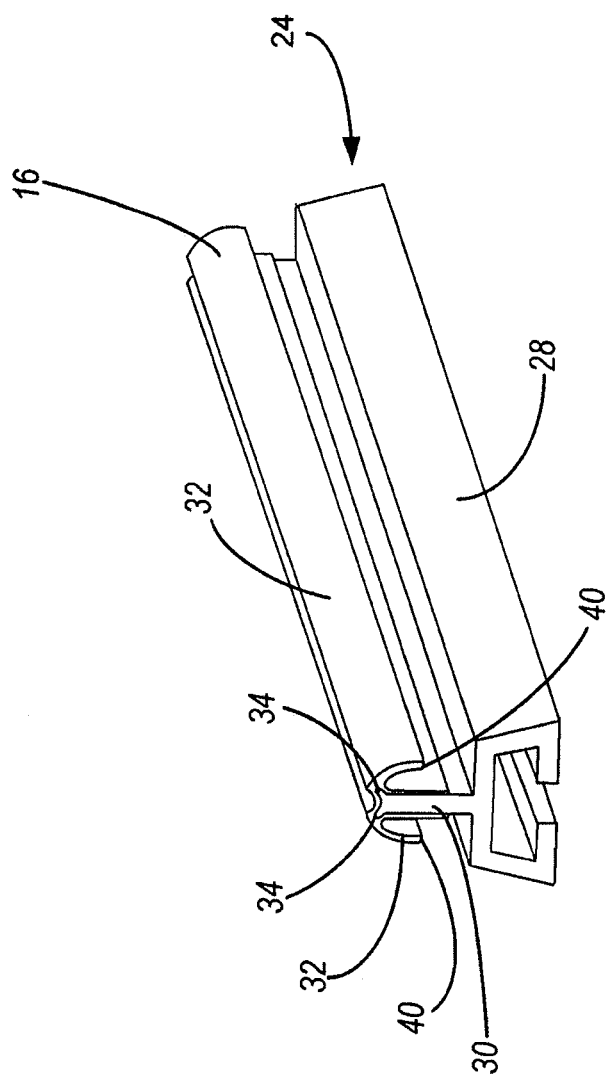
FIG. 10 is a perspective view of one embodiment of a panel insert for use in embodiments of a modular panel system of the present invention.
Figure 11:
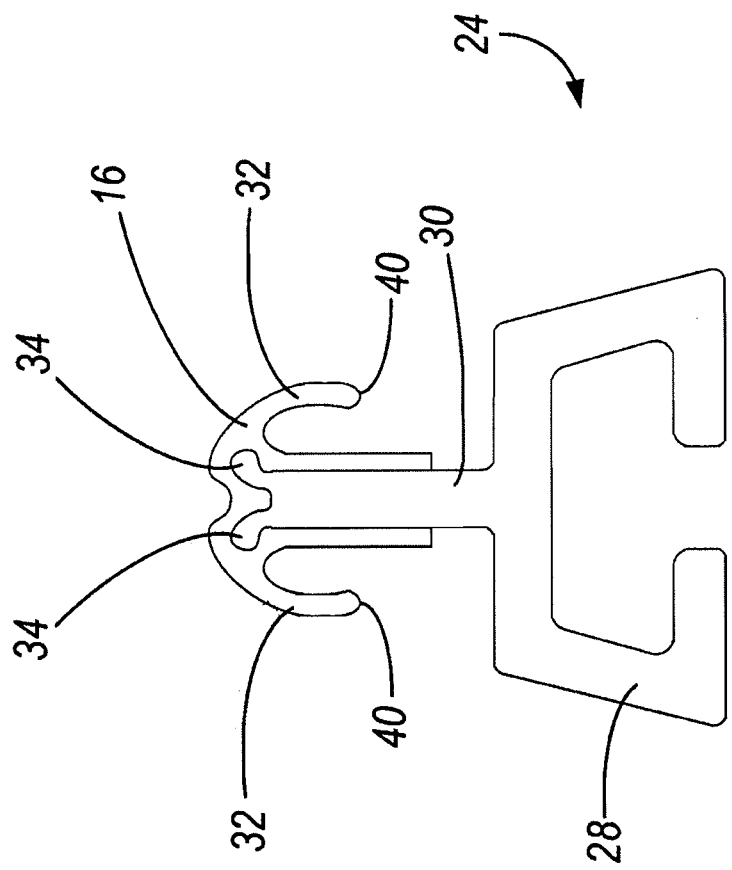
FIG. 11 is a side view of the panel insert of FIG. 10.

One embodiment of panel insert 24, shown in FIGS. 10 and 11, includes a base 28, a tongue 30, and a deformable body 16. As shown in FIGS. 10 and 11, the shape of base 28 corresponds to the shape of channel 26 shown in FIG. 12 such that insert 24 may be slid into and retained by channel 26. In other embodiments, base 28 and channel 26 can be shaped or configured in other manners such that channel 26 can receive and secure base 28. The inserts 24 may be of any length and need not extend the entirely length of a channel. Moreover, multiple inserts may be provided along the length of a channel. In some embodiments, the shape of base 28 need not correspond to the shape of channel 26 and additional means, such as mechanical (screws, nails, etc.) or chemical (adhesives or the like) means can be employed to secure the insert into the groove. In still other embodiments, channels 26 are unnecessary and the insert 24 is simply secured to the back of the panel.

FIG. 11 shows an embodiment where tongue 30 protrudes from the base 28. The base 28 and the tongue 30 are preferably, but do not have to be, formed (and preferably, but not necessarily, integrally formed) of metal and more preferably of extruded aluminum. However, the base 28 and tongue 30 may be formed of any material having sufficient strength and rigidity to withstand the weight of the panels. Other embodiments of insert 24, shown in FIGS. 14A-32 and described in further detail below, include wings, extension arms, or spring clip arms. Base 28 can have a varying profile as shown in these figures.

The deformable body 16 shown in FIGS. 10 and 11 attaches to the exterior of the tongue 30. The deformable body 16 may be a plastic covering (preferably, but not necessarily, polyvinyl chloride) or it may be any other material capable of being deformed to fit into the attachment structure 18 while resistant to removal from the attachment structure 18 after fitting, such that wall panel 12 remains secured to the wall until a sufficient amount of force is applied to remove it.

While the deformable body 16 and panel insert 24 may be co-extruded or formed in other manners, pultrusion technology is preferably used. In such a process, the base 28 and tongue 30 are extruded first, after which the deformable body 16 is extruded onto and bonds with the tongue 30. As shown in FIG. 11, tongue extensions 34 may extend from the end of the tongue 30 distal the base 28, and help retain the deformable body 16 on the tongue 30.

The deformable body 16 shown in FIGS. 10 and 11 has a shape that substantially corresponds to the shape of the attachment structures 18 formed in the panel retainers, although in other embodiments, the deformable body's shape need not correspond to the shape of the attachment structure 18, but rather can be of any shape capable of mating with attachment structure 18 or other attachment structure sufficiently to ensure retention of modular panel 12 in the panel retainer. The deformable body 16 shown has a somewhat rounded shape and includes deformable wings 32, although other shapes, with or without wings 32, are also possible. The deformable wings 32 may compress when the tongue 30 and deformable body 16 are pushed into the attachment structure 18 of panel retainer.

Once deformable wings 32 are within the attachment structure 18 in the panel retainer (as shown in FIG. 13), the wings 32 may expand somewhat to at least partially resist the removal of deformable body 16 from attachment structure 18. In some embodiments, tips 40 of the deformable wings 32 will interact with the lips 46 of the attachment structure 18 (see, e.g., FIG. 3) to resist removal of the deformable body. The lips 46 may be inward extending portions of the base 44 that define attachment structure 18, although in other embodiments, lips may be formed in other manners. The deformable body 16 and the attachment structure 18 are preferably dimensioned to result in a snap-fit or press-fit connection.

Once the panel inserts 24 have been installed on the panels 12, the panels may be affixed to the wall by inserting the panel insert tongue 30 with deformable body 16 into the attachment structure 18 of the panel retainer already installed on the wall, as shown in FIG. 13.

FIGS. 14-33 illustrate alternative embodiments for coupling the panels 12 to the panel retainers.

One embodiment of panel insert 24 is a spring clip (see FIGS. 14 and 15) that includes a base 28 that slidingly engages channel 26 in the panel 12. Attachment structure 18 on the panel retainer 14 is in the shape of a groove. The spring clip includes a deformable body in the form of extension arms 33 and is preferably made from a material (metallic or polymeric, such as, but not limited to, PVC) that permits the arms 33 to deflect inwardly upon insertion into the groove and spring outwardly after insertion to contact at least a portion of the inner walls of the groove to retain the spring clip in the groove. The shape of the extension arms 33 and the cross-sectional shape of the groove can be circular, triangular, or any shape that complements each other so that the extension arms 33 of the spring clip is retained in the groove.

Figure 17:
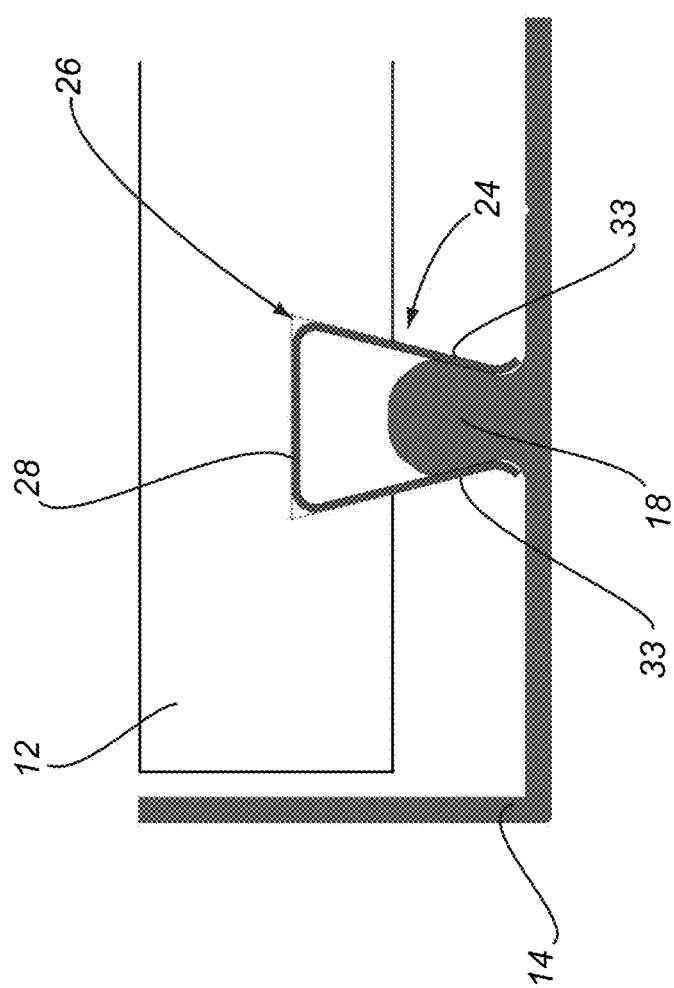
FIG. 17 is a view of another embodiment of a panel insert for use in embodiments of a modular panel system of the present invention.

Another embodiment of panel insert 24 is shown in FIGS. 16 and 17. Here, panel insert 24 is a spring clip that includes a base 28 that slidingly engages channel 26. The spring clip is adapted to attach to attachment structure 18, which is provided as a protrusion extending from the panel retainer 14. The spring clip includes extension arms 33 that deflect outwardly around, and bear against, the protrusion. The protrusion and the extension arms 33 can be of any shape that permit the extension arms 33 to grip the protrusion and thereby retain the panel 12 on the panel retainer 14.

Figures 18A, 18B:
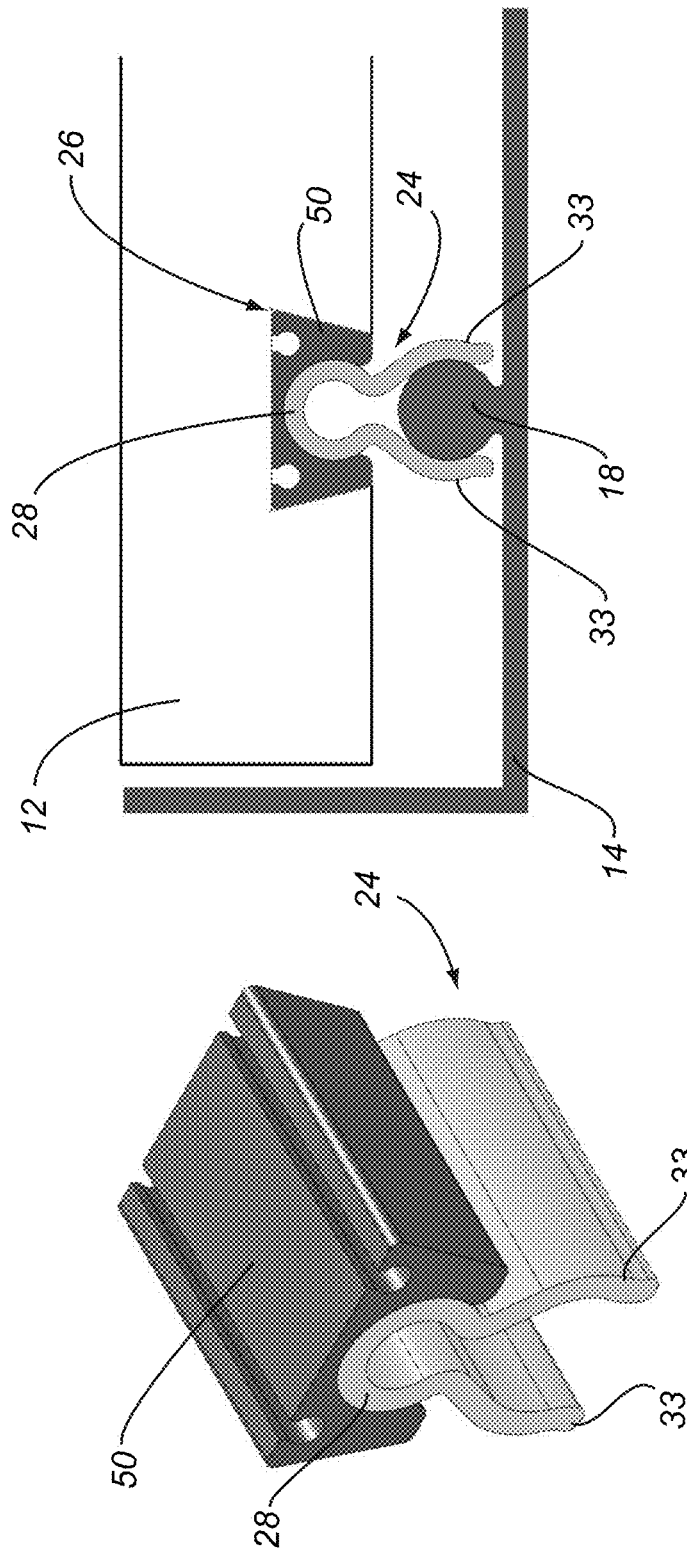
FIGS. 18A and 18B are views of another embodiment of a panel insert for use in embodiments of a modular panel system of the present invention.

Similar to the embodiment of FIG. 16, the embodiment shown in FIGS. 18A and 18B includes attachment structure 18 in the form of a protrusion and a spring clip with extension arms 33 made from a deflective material that grips the protrusion. However, the spring clip base 28 does not directly engage the channel 26 of the panel 12. Rather, the spring clip base 28 seats in an adapter 50 that, in turn, has a shape designed to mate with the channel 26 (such as via sliding engagement).

The embodiment of FIGS. 19A and 19B also uses a spring clip, however the extension arms 33 are shaped to engage the channel 26 on the panel 12. In this embodiment, spring clip base 48 engages the attachment structure 18 (illustrated as a triangular-shaped groove) on the panel retainer 14. Spring clip base 48 and attachment structure 18 are shaped so that the spring clip base 48 is retained within the groove when assembled. To insert the spring clip base 48 into the attachment structure 18, the spring clip base 48 is pressed towards the attachment structure 18 and the extension arms 33 in the channel 26 flex inwardly to permit the spring clip base 48 to pass into the groove.

FIGS. 20-31 illustrate alternative embodiments of inserts 24 similar to the embodiment shown in FIGS. 10 and 11 in that they include a base 28 and a deformable body 16 that extends from the base to engage the attachment structure 18 (illustrated as a groove) provided on the panel retainer 14. The shape of base 28 may correspond to the shape of channel 26 such that insert 24 may be slid into and be retained by channel 26. In other embodiments, however, base 28 and channel 26 can be shaped or configured in other manners such that channel 26 can receive and secure base 28. In some embodiments, the shape of base 28 need not correspond to the shape of channel 26 and additional means, such as mechanical (screws, nails, etc.) or chemical (adhesives or the like) means can be employed to secure the insert into the groove.

In the embodiments of FIGS. 20-26, a tongue 30 protrudes from the base 28. The base 28 and the tongue 30 are preferably, but do not have to be, formed (and preferably, but not necessarily, integrally formed) of metal and more preferably of extruded aluminum. However, the base 28 and tongue 30 may be formed of any material having sufficient strength and rigidity to withstand the weight of the panels 12, including polymeric materials such as PVC. The tongue may be of any suitable length and may, but does not have to, include extensions 34 to help retain the deformable body 16 on the tongue 30. FIG. 27A-E illustrate only a few examples of possible embodiments of the base 28 and tongue 30. A deformable body 16 is provided around the tongue 30. The deformable body 16 may be a plastic covering (preferably, but not necessarily, PVC) or it may be any other material capable of being deformed to fit into the attachment structure 18 while resistant to removal from the attachment structure 18 after fitting, such that wall panel 12 remains secured to the wall until a sufficient amount of force is applied to remove it.

While the deformable body 16 and base 28 may be co-extruded or formed in other manners, pultrusion technology is particularly suitable. In such a process, the base 28 and tongue 30 are extruded first, after which the deformable body 16 is extruded onto and bonds with the tongue 30.

In alternative embodiments, such as shown in FIGS. 28-31, the insert base 28 does not include a tongue but rather the deformable body 16 is attached directly to the insert base 28. By way only of example, a recess 52 may be provided in the base 28 and the deformable body may include an extension 58 designed to mate with the recess 52 to retain the deformable body 16 on the insert base 28. For example, the deformable body 16 may be extruded into the recess 52. However, other chemical and mechanical attachment means are certainly contemplated.

In still other embodiments, the panel inserts 24 (e.g., the insert base 28 and the deformable body 16) are integrally-formed from the same material. In one embodiment, the panel insert is molded from a polymeric material (such as PVC) so that different parts of the panel insert 24 have different hardnesses (known in the art as duo durometer technology). By way only of example, a panel insert base 28 and deformable body 16 could be integrally-molded from PVC such that the base 28 is harder than the deformable body 16. In this way, the deformable body 16 can deflect upon engagement with a panel retainer 14.

Figure 20B:
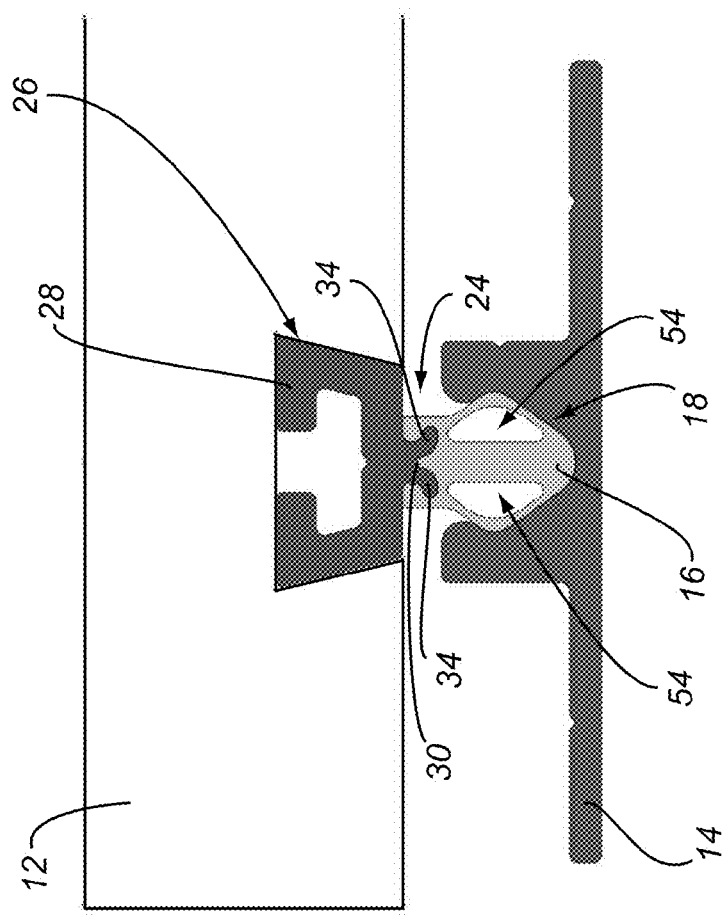
FIGS. 20A and 20B are views of another embodiment of a panel insert for use in embodiments of a modular panel system of the present invention.
Figure 20A:
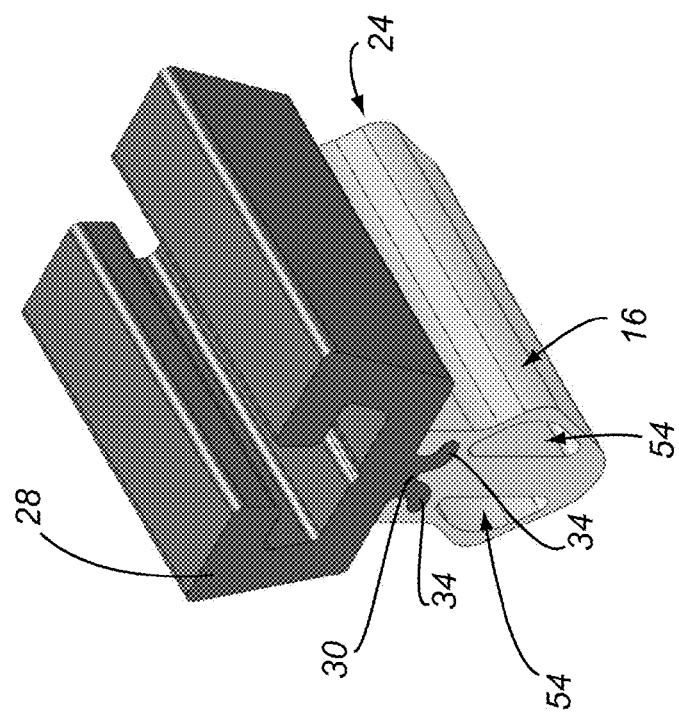
Figure 30B:
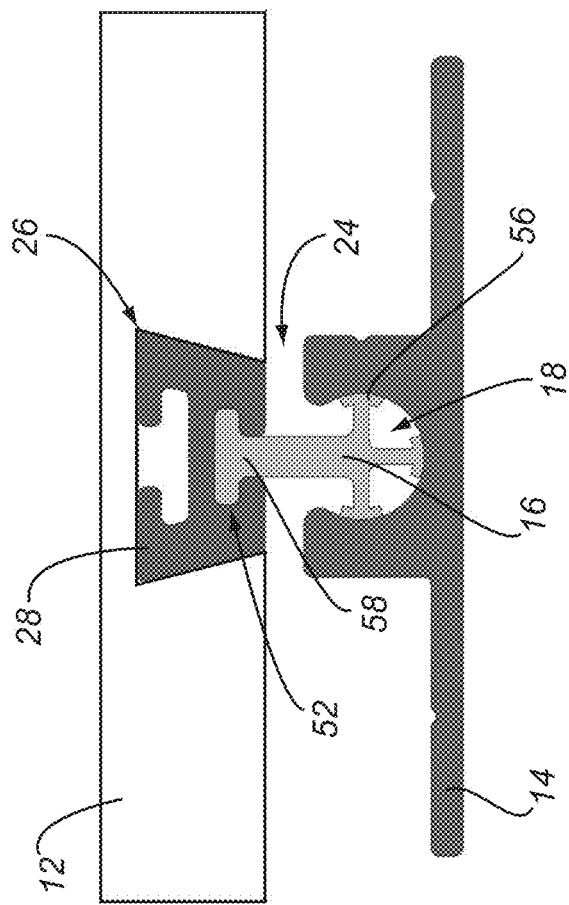
FIGS. 30A and 30B are views of another embodiment of a panel insert for use in embodiments of a modular panel system of the present invention.
Figure 30A:
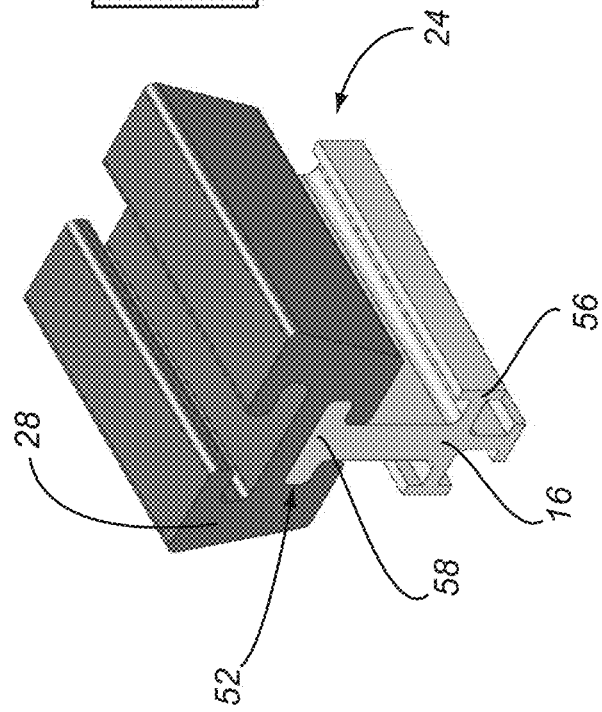

The shape of the deformable body 16 can substantially correspond to the shape of the attachment structure 18, as illustrated in FIGS. 20A and 20B and in FIGS. 21A and 21B, which respectively illustrate deformable bodies 16 and attachment structures 18 having corresponding diamond and circular shapes. Openings 54 can be, but do not have to be, provided in the deformable body 16 to facilitate deflection of the deformable body 16 inwardly upon insertion into the attachment structure 18.

However, the shape of the deformable body 16 and the attachment structure 18 need not be the same, as illustrated in FIGS. 22-26B and 28-31, which all illustrate a circular groove as the attachment structure 18 and a non-circular deformable body 16 for engagement with the circular groove. In FIGS. 22A-C, the deformable body 16 includes four rounded arms 56 that form a substantially X-shape. In FIGS. 23A and 23B, the deformable body 16 includes four rectilinear arms 56 that form a substantially X-shape. An indentation 64 is, but does not have to be, provided between the two distal arms to facilitate inward deflection of the arms during insertion of the deformable body 16 into the groove 18. In FIGS. 24A and 24B, the deformable body 16 is substantially arrow-shaped and also includes (but does not have to include) an indentation 64 similar to that of FIG. 23. In FIGS. 25A and 25B, the deformable body 16 is substantially claw-shaped and includes a taper 66 that is engaged by lips 46 of the attachment structure 18 to help retain the deformable body 16 in position within the groove. The deformable body 16 of FIGS. 26A-C includes arms that bear against the lips 46 of the attachment structure 18 to bias the deformable body 16 with the groove. Again, attachment structures 18 of any shape may be used, as illustrated in FIGS. 26B and 26C, where the deformable body 16 engages a rectangular (not circular) attachment structure 18. In FIGS. 28A and 28B, the deformable body 16 is anchor-shaped and has interior arms 68, 69 that engage the inner wall of the attachment structure 18 and exterior arms 70, 71 that engage the panel retainer 14 outside of the attachment structure 18 to bias the interior arms 68, 69 against the inner wall of the groove and thereby help retain the deformable body 16 in the groove. In FIGS. 29A and 29B, the deformable body 16 includes a plurality of arms 56 that radiate out from the center of the body to contact the inner wall of the attachment structure 18. The deformable body 16 of FIGS. 30A and 30B is shaped as an inverted cross and also includes a plurality of arms 56 that extend from the body to contact the inner wall of the groove. The deformable body 16 of FIGS. 31A and 31B has an octagon shape and includes an opening 54 to facilitate insertion of the deformable body 16 into the attachment structure 18 and a taper 66 (similar to that of the embodiment of FIGS. 25A-B) to facilitate its retention in the groove. One of skill in the art will readily understand that deformable bodies 16 of any shape may be provided on any of the disclosed insert bases 28 and this disclosure is only intended to illustrate a subset of such combinations.

FIGS. 32A, 32B, and 33 illustrate alternative embodiments of panel inserts 24 in the form of clips. In FIGS. 32A and 32B, the clip engages channel 26 in the back of panel 12 as well as a groove 18 and protrusion 60 provided on the panel retainer 14. In FIG. 33, the clip engages a channel 26 provided along the edge of the panel 12 and wraps around a protrusion 60 on the panel retainer 14.

The foregoing is provided for the purpose of illustrating, explaining and describing embodiments of the present invention. Further modifications and adaptations to these embodiments will be apparent to those skilled in the art and may be made without departing from the spirit of the invention or the scope of the claims.

We claim:

1. A modular panel system for mounting a panel on a substrate comprising:
   (a) a panel retainer comprising a base wall having a substantially planar rear surface and a front surface opposite the rear surface, wherein a groove having a cross-sectional shape is defined in the front surface and wherein the panel retainer is adapted to be mounted on the substrate so that the rear surface of the panel abuts the substrate;
   (b) a panel comprising a front side, a back side adapted to be positioned more proximate the substrate than the front side, a plurality of edges and at least one channel having a longitudinal channel axis and extending along the back side of the panel; and
   (c) an insert retained on the panel by the at least one channel and comprising:
      (i) a base for insertion into the at least one channel; and
      (ii) a deformable body inseparable from and extending from the base;
   wherein the base is adapted to slide within the at least one channel after insertion into the channel in a direction parallel to the longitudinal channel axis so that the deformable body is able to extends from the back side of the panel a distance from each of the plurality of panel edges and engage the groove to secure the panel to the panel retainer.

2. The modular panel system of claim 1, wherein the groove comprises a cross-sectional shape and the deformable body comprises a cross-sectional shape that corresponds to the cross-sectional shape of the groove.

3. The modular panel system of claim 1, wherein the insert comprises a spring clip, and wherein the deformable body comprises extension arms on the spring clip that engage the groove.

4. The modular panel system of claim 1, wherein the deformable body comprises a cross-sectional shape of at least one of a substantially x-shape, a substantially anchor shape, a substantially circular shape, a substantially cross shape, a substantially diamond shape, or a substantially arrow shape.

5. The modular panel system of claim 1, wherein the deformable body comprises arms that engage a surface of the groove.

6. The modular panel system of claim 1, wherein the deformable body comprises a taper portion and wherein the groove comprises lips that engage the taper portion.

7. The modular panel system of claim 1, wherein the base of the insert is removable from the channel only in a direction parallel to the longitudinal channel axis.

8. The modular panel system of claim 1, wherein the channel and the base of the insert interact via a sliding dovetail.

9. The modular panel system of claim 1, wherein the base and deformable body are integrally-molded from a polymeric material.

10. The modular panel system of claim 9, wherein the polymeric material comprises polyvinyl chloride.

11. The modular panel system of claim 9, wherein the polymeric material of the base is harder than the polymeric material of the deformable body.

12. The modular panel system of claim 1, wherein the deformable body extends directly from the base.

13. The modular panel system of claim 1, wherein the insert further comprises a tongue that extends from the base and onto which the deformable body is bonded.

14. The modular panel system of claim 1, wherein the deformable body of the insert is adapted to deform upon engagement with the groove.

15. The modular panel system of claim 1, wherein the deformable body is formed integrally with the base.

16. The modular panel system of claim 1, wherein the deformable body comprises a cross-sectional shape of at least one of a substantially x-shape, a substantially anchor shape, a substantially cross shape, a substantially diamond shape, or a substantially arrow shape and wherein the cross-sectional shape of the groove is substantially arcuate-shaped.

17. A modular panel system for mounting a panel on a substrate comprising:
(a) a panel retainer comprising a base wall having a rear surface and a front surface opposite the rear surface, wherein a groove having a substantially arcuate cross-sectional shape is defined in the front surface and wherein the panel retainer is adapted to be mounted on the substrate so that the rear surface of the panel is more proximate the substrate than the front surface;
(b) a panel comprising a front side, a back side adapted to be positioned more proximate the substrate than the front side, a plurality of edges and at least one channel having a longitudinal channel axis and extending along the back side of the panel; and
(c) an insert retained on the panel by the at least one channel and comprising:
(i) a base for insertion into the at least one channel; and
(ii) a deformable body inseparable from and extending from the base, wherein the deformable body comprises a cross-sectional shape of at least one of a substantially x-shape, a substantially anchor shape, a substantially cross shape, a substantially diamond shape, or a substantially arrow shape,
wherein the base is adapted to slide within the at least one channel after insertion into the channel in a direction parallel to the longitudinal channel axis so that the deformable body is able to extend from the back side of the panel a distance from each of the plurality of panel edges and engage the groove to secure the panel to the panel retainer.

* * * * *